(12) United States Patent
Prentice et al.

(10) Patent No.: US 8,992,764 B2
(45) Date of Patent: Mar. 31, 2015

(54) INTEGRATED HYDROCRACKING AND DEWAXING OF HYDROCARBONS

(75) Inventors: Krista Marie Prentice, Bethlehem, NJ (US); Michel Daage, Hellertown, PA (US); Ajit Bhaskar Dandekar, Bridgewater, NJ (US); Christopher Gordon Oliveri, Stewartsville, NJ (US); Rohit Vijay, Annandale, NJ (US); Stephen J. McCarthy, Center Valley, PA (US); Wenyih F. Lai, Bridgewater, NJ (US); Bradley R. Fingland, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 935 days.

(21) Appl. No.: 13/169,409

(22) Filed: Jun. 27, 2011

(65) Prior Publication Data

US 2011/0315596 A1 Dec. 29, 2011

Related U.S. Application Data

(60) Provisional application No. 61/359,571, filed on Jun. 29, 2010.

(51) Int. Cl.
| | |
|---|---|
| C10G 73/38 | (2006.01) |
| C10G 73/44 | (2006.01) |
| C10G 45/02 | (2006.01) |
| C10G 45/64 | (2006.01) |
| C10G 47/16 | (2006.01) |
| C10G 7/00 | (2006.01) |
| C10G 49/22 | (2006.01) |
| C10G 65/12 | (2006.01) |
| C10G 65/04 | (2006.01) |
| B01J 29/74 | (2006.01) |
| B01J 35/02 | (2006.01) |

(52) U.S. Cl.
CPC ............... *C10G 65/12* (2013.01); *C10G 45/64* (2013.01); *C10G 65/043* (2013.01); *C10G 2300/302* (2013.01); *C10G 2300/4081* (2013.01); *C10G 2400/02* (2013.01); *C10G 2400/04* (2013.01); *C10G 2400/10* (2013.01); *C10G 2300/4018* (2013.01); *C10G 2300/202* (2013.01); *B01J 29/7461* (2013.01); *B01J 35/026* (2013.01); *B01J 2229/36* (2013.01); *B01J 2229/42* (2013.01)
USPC ................... 208/27; 208/59; 208/83; 208/89; 208/100; 208/109

(58) Field of Classification Search
USPC .......................... 208/27, 59, 83, 89, 100, 109
See application file for complete search history.

(56) References Cited

U.S. PATENT DOCUMENTS

| | | |
|---|---|---|
| 3,790,472 A | 2/1974 | White |
| 4,661,239 A | 4/1987 | Steigleder |
| 5,565,088 A | 10/1996 | Nair et al. |
| 5,580,442 A | 12/1996 | Kwon et al. |
| 6,103,101 A * | 8/2000 | Fragelli et al. ................. 208/89 |
| 6,517,704 B1 | 2/2003 | Carroll et al. |
| 6,623,624 B2 | 9/2003 | Cash et al. |
| 6,884,339 B2 | 4/2005 | Benazzi et al. |
| 7,300,900 B2 | 11/2007 | Benazzi et al. |
| 7,371,315 B2 | 5/2008 | Benazzi et al. |

OTHER PUBLICATIONS

Johnson, M Arvin F. L., "Estimation of the Zeolite Content of a Catalyst from Nitrogen Adsorption Isotherms", Journal of Catalysis, 52, 425-431 (1978).

* cited by examiner

*Primary Examiner* — Randy Boyer
(74) *Attorney, Agent, or Firm* — Robert A. Migliorini

(57) ABSTRACT

An integrated process for producing naphtha fuel, diesel fuel and/or lubricant base oils from feedstocks under sour conditions is provided. The ability to process feedstocks under higher sulfur and/or nitrogen conditions allows for reduced cost processing and increases the flexibility in selecting a suitable feedstock. The sour feed can be delivered to a catalytic dewaxing step without any separation of sulfur and nitrogen contaminants. The integrated process includes an initial dewaxing of a feed under sour conditions, optional hydrocracking of the dewaxed feed, and a separation to form a first diesel product and a bottoms fraction. The bottoms fraction is then exposed to additional hydrocracking and dewaxing to form a second diesel product and optionally a lubricant base oil product. Alternatively, a feedstock can be hydrotreated, fractionated, dewaxed, and then hydrocracked to form a diesel fuel and a dewaxed, hydrocracked bottoms fraction that is optionally suitable for use as a lubricant base oil.

16 Claims, 9 Drawing Sheets

|  | 320 C | | 330 C | | 340 C | | 350 C | | 360 C | |
| --- | --- | --- | --- | --- | --- | --- | --- | --- | --- | --- |
|  | Conv (wt%) | Diesel Yield (wt%) | Conv (wt%) | Diesel Yield (wt%) | Conv (wt%) | Diesel Yield (wt%) | Conv (wt%) | Diesel Yield (wt%) | Conv (wt%) | Diesel Yield (wt%) |
| USY | 26.38 | 19.9 | 36.85 | 25.39 | 49.16 | 30.08 | 68.92 | 35.68 | 90.21 | 34 |
| ZSM-48 (70:1)/USY | 26.56 | 19.67 | 41.38 | 27.92 | 60.51 | 35.53 | 84.15 | 39.18 | 97.21 | 29.36 |
| USY/ZSM-48 (70:1) | 24.46 | 18.47 | 33.66 | 23.79 | 47.95 | 29.98 | 70.73 | 36.04 | 88.79 | 29.25 |
| ZSM-48 (90:1)/USY | 26.25 | 19 | 40.42 | 26.2 | 58.29 | 33.04 | 82.2 | 37.83 | 96.67 | 29.35 |
| USY/ZSM-48 (90:1) | 23.45 | 17.35 | 32.42 | 22.5 | 46.21 | 28.48 | 68.74 | 34.59 | 87.54 | 28.85 |
| ZSM-23 (64:1)/USY | 28 | 19.04 | 39.39 | 24.08 | 52.26 | 28.38 | 71.72 | 34.2 | 89.12 | 32.22 |
| USY/ZSM-23 (64:1) | 24.14 | 16.9 | 32.38 | 20.91 | 41.5 | 25.2 | 61.74 | 32.02 | 80.56 | 31.33 |

FIG. 5

INTEGRATED HYDROCRACKING AND DEWAXING OF HYDROCARBONS

CROSS-REFERENCE TO RELATED APPLICATIONS

This is a non-provisional application that claims priority to U.S. Provisional Patent Application No. 61/359,571 filed on Jun. 29, 2010, herein incorporated by reference in its entirety.

FIELD

This disclosure provides a system and a method for processing of sulfur- and/or nitrogen-containing feedstocks to produce diesel fuels and lubricating oil basestocks.

BACKGROUND

Hydrocracking of hydrocarbon feedstocks is often used to convert lower value hydrocarbon fractions into higher value products, such as conversion of vacuum gas oil (VGO) feedstocks to diesel fuel and lubricants. Typical hydrocracking reaction schemes can include an initial hydrotreatment step, a hydrocracking step, and a post hydrotreatment step. After these steps, the effluent can be fractionated to separate out a desired diesel fuel and/or lubricant oil basestock.

One method of classifying lubricating oil basestocks is that used by the American Petroleum Institute (API). API Group II basestocks have a saturates content of 90 wt % or greater, a sulfur content of not more than 0.03 wt % and a VI greater than 80 but less than 120. API Group III basestocks are the same as Group II basestocks except that the VI is at least 120. A process scheme such as the one detailed above is typically suitable for production of Group II and Group III basestocks from an appropriate feed.

U.S. Pat. No. 6,884,339 describes a method for processing a feed to produce a lubricant base oil and optionally distillate products. A feed is hydrotreated and then hydrocracked without intermediate separation. An example of the catalyst for hydrocracking can be a supported Y or beta zeolite. The catalyst also includes a hydro-dehydrogenating metal, such as a combination of Ni and Mo. The hydrotreated, hydrocracked effluent is then atmospherically distilled. The portion boiling above 340° C. is catalytically dewaxed in the presence of a bound molecular sieve that includes a hydro-dehydrogenating element. The molecular sieve can be ZSM-48, EU-2, EU-11, or ZBM-30. The hydro-dehydrogenating element can be a noble Group VIII metal, such as Pt or Pd.

U.S. Pat. No. 7,371,315 describes a method for producing a lubricant base oil and optionally distillate products. A feed is provided with a sulfur content of less than 1000 wppm. Optionally, the feed can be a hydrotreated feed. Optionally, the feed can be a hydrocracked feed, such as a feed hydrocracked in the presence of a zeolite Y-containing catalyst. The feed is converted on a noble metal on an acidic support. This entire converted feed can be dewaxed in the presence of a dewaxing catalyst.

U.S. Pat. No. 7,300,900 describes a catalyst and a method for using the catalyst to perform conversion on a hydrocarbon feed. The catalyst includes both a Y zeolite and a zeolite selected from ZBM-30, ZSM-48, EU-2, and EU-11. Examples are provided of a two stage process, with a first stage hydrotreatment of a feed to reduce the sulfur content of the feed to 15 wppm, followed by hydroprocessing using the catalyst containing the two zeolites. An option is also described where it appears that the effluent from a hydrotreatment stage is cascaded without separation to the dual-zeolite catalyst, but no example is provided of the sulfur level of the initial feed for such a process.

SUMMARY

In an embodiment, a method is provided for producing a naphtha fuel, a diesel fuel, and a lubricant basestock. The method includes contacting a hydrotreated feedstock with a hydrocracking catalyst under first effective hydrocracking conditions to produce a hydrocracked effluent. The hydrotreated feedstock is cascaded to the hydrocracking catalyst without intermediate separation. The entire hydrocracked effluent is cascaded, without separation, to a catalytic dewaxing stage. The entire hydrocracked effluent is dewaxed under first effective catalytic dewaxing conditions in the presence of a dewaxing catalyst. The dewaxing catalyst includes at least one non-dealuminated, unidimensional, 10-member ring pore zeolite, and at least one Group VI metal, Group VIII metal or combination thereof. Optionally, the dewaxing catalyst can include at least one low surface area metal oxide, refractory binder. The combined total sulfur in liquid and gaseous forms fed to the dewaxing stage is greater than 1000 ppm by weight of sulfur on a hydrotreated feedstock basis. The dewaxed effluent is fractionated to produce at least a naphtha product fraction, a first diesel product fraction, and a bottoms fraction. The bottoms fraction is hydrocracked under second effective hydrocracking conditions. The bottoms fraction is also dewaxed under second effective catalytic dewaxing conditions. The dewaxing of the bottoms fraction can occur prior to hydrocracking, after hydrocracking, or both prior to and after hydrocracking. The hydrocracked, dewaxed bottoms fraction is fractionated to form at least a second diesel product fraction and a lubricant base oil product fraction.

In another embodiment, a method for producing a diesel fuel and a lubricant basestock is provided. The method includes contacting a hydrotreated feedstock with a dewaxing catalyst under first effective dewaxing conditions to produce a dewaxed effluent. The dewaxing catalyst includes at least one non-dealuminated, unidimensional, 10-member ring pore zeolite, and at least one Group VI metal, Group VIII metal or combination thereof. Optionally, the dewaxing catalyst can include at least one low surface area metal oxide, refractory binder. The hydrotreated feedstock is cascaded to the dewaxing catalyst without intermediate separation. The dewaxed effluent is fractionated to produce at least a first diesel product fraction and a bottoms fraction. The bottoms fraction is hydrocracked under first effective hydrocracking conditions. The bottoms fraction is also dewaxed under second effective catalytic dewaxing conditions. The hydrocracked, dewaxed bottoms fraction is fractionated to form at least a second diesel product fraction and a lubricant base oil product fraction.

In still another embodiment, a method for producing a diesel fuel and a lubricant basestock is provided. The method includes contacting a feedstock with a hydrotreating catalyst under first effective hydrotreating conditions to produce a hydrotreated effluent. The hydrotreated effluent is fractionated to produce at least a first diesel product fraction and a bottoms fraction. The bottoms fraction is dewaxed under effective catalytic dewaxing conditions, the dewaxing catalyst includes at least one non-dealuminated, unidimensional, 10-member ring pore zeolite, and at least one Group VI metal, Group VIII metal, or combination thereof. Optionally, the dewaxing catalyst can include at least one low surface area metal oxide, refractory binder. The bottoms fraction is also hydrocracked under effective hydrocracking conditions. The hydrocracked, dewaxed bottoms fraction is fractionated to form at least a second diesel product fraction and a lubricant base oil product fraction.

In still yet another embodiment, a method for producing a diesel fuel and a lubricant basestock is provided. The method includes contacting a feedstock with a hydrotreating catalyst under effective hydrotreating conditions to produce a hydrotreated effluent; fractionating the hydrotreated effluent to produce at least a first diesel product fraction and a bottoms fraction; hydrocracking the bottoms fraction under effective hydrocracking conditions; dewaxing the bottoms fraction under effective catalytic dewaxing conditions, the dewaxing catalyst including at least one non-dealuminated, unidimensional, 10-member ring pore zeolite, and at least one Group VI metal, Group VIII metal or combination thereof; and fractionating the hydrocracked, dewaxed bottoms fraction to form at least a second diesel product fraction and a lubricant base oil product fraction.

In still yet another embodiment, a method for producing a diesel fuel and a lubricant basestock is provided. The method includes contacting a feedstock with a hydrotreating catalyst under effective hydrotreating conditions to produce a hydrotreated effluent; fractionating the hydrotreated effluent to produce at least a first diesel product fraction and a first bottoms fraction; dewaxing the bottoms fraction under effective catalytic dewaxing conditions, the dewaxing catalyst including at least one non-dealuminated, unidimensional, 10-member ring pore zeolite, and at least one Group VI metal, Group VIII metal or combination thereof; fractionating the dewaxed bottoms fraction to form at least a second diesel product fraction and a second bottoms fraction; hydrocracking the second bottoms fraction under effective hydrocracking conditions to form a third bottoms fraction; and fractionating the third bottoms fraction to form at least a naphtha product fraction, a diesel product fraction and a lubricant base oil product fraction.

In still yet another embodiment, a method for producing a diesel fuel and a lubricant basestock is provided. The method includes contacting a feedstock with a hydrotreating catalyst under effective hydrotreating conditions to produce a hydrotreated effluent; fractionating the hydrotreated effluent to produce at least a first diesel product fraction and a first bottoms fraction; hydrocracking the first bottoms fraction under effective hydrocracking conditions to form a second bottoms fraction; fractionating the second bottoms fraction to form at least a second diesel product fraction and a third bottoms fraction; dewaxing at least a portion of the third bottoms fraction under effective catalytic dewaxing conditions, the dewaxing catalyst including at least one non-dealuminated, unidimensional, 10-member ring pore zeolite, and at least one Group VI metal, Group VIII metal or combination thereof; and fractionating the dewaxed third bottoms fraction and the non-dewaxed third bottoms fraction to form at least a naphtha product fraction, a third diesel product fraction and a lubricant base oil product fraction.

In still yet another embodiment, a method is provided for producing a naphtha fuel, a diesel fuel, and a lubricant basestock. The method includes contacting a hydrotreated feedstock with a hydrocracking catalyst under first effective hydrocracking conditions to produce a hydrocracked effluent. The hydrotreated feedstock is cascaded to the hydrocracking catalyst without intermediate separation. The entire hydrocracked effluent is cascaded, without separation, to a catalytic dewaxing stage. The entire hydrocracked effluent is dewaxed under first effective catalytic dewaxing conditions in the presence of a dewaxing catalyst. The dewaxing catalyst includes at least one non-dealuminated, unidimensional, 10-member ring pore zeolite, and at least one Group VI metal, Group VIII metal or combination thereof. Optionally, the dewaxing catalyst can include at least one low surface area metal oxide, refractory binder. The combined total sulfur in liquid and gaseous forms fed to the dewaxing stage is greater than 1000 ppm by weight of sulfur on a hydrotreated feedstock basis. The dewaxed effluent is fractionated to produce at least a naphtha product fraction, a first diesel product fraction, and a bottoms fraction. The bottoms fraction is hydrocracked under second effective hydrocracking conditions. The bottoms fraction is also dewaxed under second effective catalytic dewaxing conditions. The dewaxing of the bottoms fraction can occur prior to hydrocracking, after hydrocracking, or both prior to and after hydrocracking. The hydrocracked, dewaxed bottoms fraction is fractionated to form at least a second diesel product fraction and a lubricant base oil product fraction.

BRIEF DESCRIPTION OF THE DRAWINGS

FIGS. 5 and 6 show measured feed conversion and diesel fuel product yields for various processing configurations.

DETAILED DESCRIPTION

Figure 1:
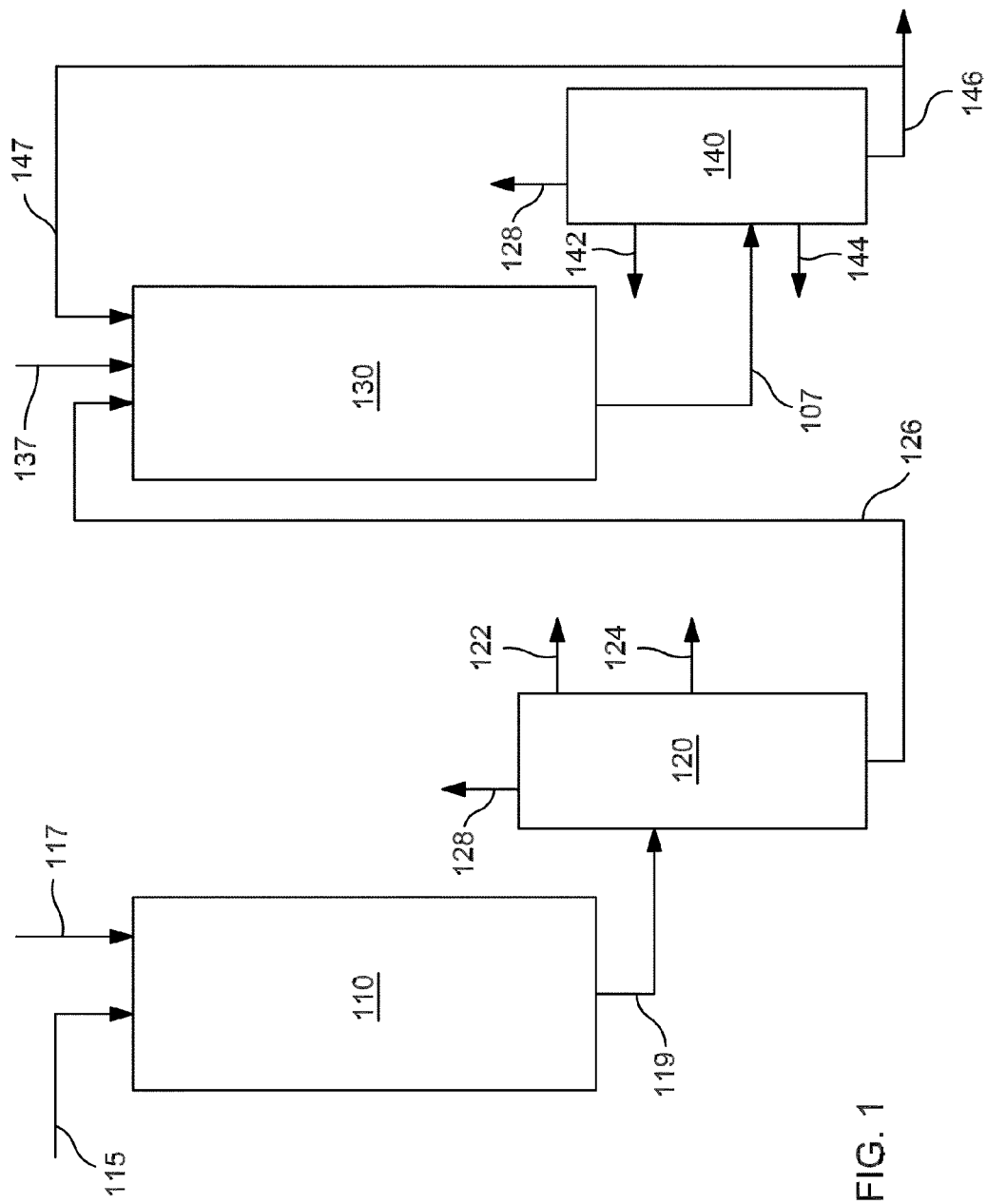
FIG. 1 schematically shows an example of a multi-stage reaction system according to an embodiment of the invention.

All numerical values within the detailed description and the claims herein are modified by "about" or "approximately" the indicated value, and take into account experimental error and variations that would be expected by a person having ordinary skill in the art.

Overview

One option for processing a heavier feed, such as a heavy distillate or gas oil type feed, is to use hydrocracking to convert a portion of the feed. Portions of the feed that are converted below a specified boiling point, such as a 700° F. (371° C.) portion that can be used for naphtha and diesel fuel products, while the remaining unconverted portions can be used as lubricant oil basestocks.

Improvements in diesel and/or lube basestock yield can be based in part on alternative configurations that are made possible by use of a dewaxing catalyst. For example, zeolite Y based hydrocracking catalysts are selective for cracking of cyclic and/or branched hydrocarbons. Paraffinic molecules with little or no branching may require severe hydrocracking conditions in order to achieve desired levels of conversion. This can result in overcracking of the cyclic and/or more heavily branched molecules in a feed. A catalytic dewaxing process can increase the branching of paraffinic molecules. This can increase the ability of a subsequent hydrocracking stage to convert the paraffinic molecules with increased numbers of branches to lower boiling point species.

In various embodiments, a dewaxing catalyst can be selected that is suitable for use in a sweet or sour environment while minimizing conversion of higher boiling molecules to naphtha and other less valuable species. The dewaxing catalyst can be used as part of an integrated process in a first stage that includes an initial hydrotreatment of the feed, hydrocracking of the hydrotreated feed, and dewaxing of the effluent from the hydrocracking, and an optional final hydrotreatment. Alternatively, the dewaxing stage can be performed on the hydrotreated feed prior to hydrocracking. Optionally, the hydrocracking stage can be omitted. The treated feed can then be fractionated to separate out the portions of the feed that boil below a specified temperature, such as below 700° F. (371° C.).

A second stage can then be used to process the unconverted bottoms from the fractionator. The bottoms fraction can be hydrocracked for further conversion, optionally hydrofinished, and optionally dewaxed.

In a conventional scheme, any catalytic dewaxing and/or hydroisomerization is performed in a separate reactor. This is due to the fact conventional catalysts are poisoned by the heteroatom contaminants (such as $H_2S$ $NH_3$, organic sulfur and/or organic nitrogen) typically present in the hydrocracker effluent. Thus, in a conventional scheme, a separation step is used to first decrease the amount of the heteroatom contaminants. Because a distillation also needs to be performed to separate various cuts from the hydrocracker effluent, the separation may be performed at the same time as distillation, and therefore prior to dewaxing. This means that some valuable hydrocarbon molecules that could be used in a diesel or lube basestock cut are left out.

In various embodiments, a layer of dewaxing catalyst can be included after a hydrotreating and/or hydrocracking step in the first stage, without the need for a separation stage. By using a contaminant tolerant catalyst, a mild dewaxing step can be performed on the entire hydrotreated, hydrocracked, or hydrotreated and hydrocracked effluent. This means that all molecules present in the effluent are exposed to mild dewaxing. This mild dewaxing will modify the boiling point of longer chain molecules, thus allowing molecules that would normally exit a distillation step as bottoms to be converted to molecules suitable for lubricant basestock. Similarly, some molecules suitable for lubricant basestock will be converted to diesel range molecules.

By having a dewaxing step in the first sour stage, the cold flow properties of the effluent from the first stage can be improved. This can allow a first diesel product to be generated from the fractionation after the first stage. Producing a diesel product from the fractionation after the first stage can provide one or more advantages. This can avoid further exposure of the first diesel product to hydrocracking, and therefore reduces the amount of naphtha generated relative to diesel. Removing a diesel product from the fractionator after the first stage also reduces the volume of effluent that is processed in the second or later stages. Still another advantage can be that the bottoms product from the first stage has an improved quality relative to a first stage without dewaxing functionality. For example, the bottoms fraction used as the input for the second stage can have improved cold flow properties. This can reduce the severity needed in the second stage to achieve a desired product specification.

The second stage can be configured in a variety of ways. One option can be to emphasize diesel production. In this type of option, a portion of the unconverted bottoms from the second stage can be recycled to the second stage. This can optionally be done to extinction, to maximize diesel production. Alternatively, the second stage can be configured to produce at least some lubricant base stock from the bottoms.

Still another advantage can be the flexibility provided by some embodiments. Including a dewaxing capability in both the first stage and the second stage can allow the process conditions to be selected based on desired products, as opposed to selecting conditions to protect catalysts from potential poisoning.

The dewaxing catalysts used according to the invention can provide an activity advantage relative to conventional dewaxing catalysts in the presence of sulfur feeds. In the context of dewaxing, a sulfur feed can represent a feed containing at least 100 ppm by weight of sulfur, or at least 1000 ppm by weight of sulfur, or at least 2000 ppm by weight of sulfur, or at least 4000 ppm by weight of sulfur, or at least 40,000 ppm by weight of sulfur. The feed and hydrogen gas mixture can include greater than 1,000 ppm by weight of sulfur or more, or 5,000 ppm by weight of sulfur or more, or 15,000 ppm by weight of sulfur or more. In yet another embodiment, the sulfur may be present in the gas only, the liquid only or both. For the present disclosure, these sulfur levels are defined as the total combined sulfur in liquid and gas forms fed to the dewaxing stage in parts per million (ppm) by weight on the hydrotreated feedstock basis.

This advantage can be achieved by the use of a catalyst comprising a 10-member ring pore, one-dimensional zeolite in combination with a low surface area metal oxide refractory binder, both of which are selected to obtain a high ratio of micropore surface area to total surface area. Alternatively, the zeolite has a low silica to alumina ratio. As another alternative, the catalyst can comprise an unbound 10-member ring pore, one-dimensional zeolite. The dewaxing catalyst can further include a metal hydrogenation function, such as a Group VI or Group VIII metal, and preferably a Group VIII noble metal. Preferably, the dewaxing catalyst is a one-dimensional 10-member ring pore catalyst, such as ZSM-48 or ZSM-23.

The external surface area and the micropore surface area refer to one way of characterizing the total surface area of a catalyst. These surface areas are calculated based on analysis of nitrogen porosimetry data using the BET method for surface area measurement. (See, for example, Johnson, M. F. L., Jour. Catal., 52, 425 (1978).) The micropore surface area refers to surface area due to the unidimensional pores of the zeolite in the dewaxing catalyst. Only the zeolite in a catalyst will contribute to this portion of the surface area. The external surface area can be due to either zeolite or binder within a catalyst.

Feedstocks

A wide range of petroleum and chemical feedstocks can be hydroprocessed in accordance with the present invention. Suitable feedstocks include whole and reduced petroleum crudes, atmospheric and vacuum residua, propane deasphalted residua, e.g., brightstock, cycle oils, FCC tower bottoms, gas oils, including atmospheric and vacuum gas oils and coker gas oils, light to heavy distillates including raw virgin distillates, hydrocrackates, hydrotreated oils, dewaxed oils, slack waxes, Fischer-Tropsch waxes, raffinates, and mixtures of these materials. Typical feeds would include, for example, vacuum gas oils boiling up to about 593° C. (about 1100° F.) and usually in the range of about 350° C. to about 500° C. (about 660° F. to about 935° F.) and, in this case, the proportion of diesel fuel produced is correspondingly greater. In some embodiments, the sulfur content of the feed can be at least 100 ppm by weight of sulfur, or at least 1000 ppm by weight of sulfur, or at least 2000 ppm by weight of sulfur, or at least 4000 ppm by weight of sulfur, or at least 40,000 ppm by weight of sulfur.

Note that for stages that are tolerant of a sour processing environment, a portion of the sulfur in a processing stage can be sulfur containing in a hydrogen treat gas stream. This can allow, for example, an effluent hydrogen stream from a hydroprocessing reaction that contains $H_2S$ as an impurity to be used as a hydrogen input to a sour environment process without removal of some or all of the $H_2S$. The hydrogen stream containing $H_2S$ as an impurity can be a partially cleaned recycled hydrogen stream from one of the stages of a process according to the invention, or the hydrogen stream can be from another refinery process.

Process Flow Schemes

In the discussion below, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

A variety of process flow schemes are available according to various embodiments of the invention. In one example, a feed can initially by hydrotreated by exposing the feed to one or more beds of hydrotreatment catalyst. The entire hydrotreated feed, without separation, can then be hydrocracked in the presence of one or more beds of hydrocracking catalyst. The entire hydrotreated, hydrocracked feed, without separation, can then be dewaxed in the presence of one or more beds of dewaxing catalyst. An optional second hydrotreatment catalyst bed can also be included after either the hydrocracking or the dewaxing processes. By performing hydrotreating, hydrocracking, and dewaxing processes without an intermediate separation, the equipment required to perform these processes can be included in a single stage.

In another example, a feed can initially by hydrotreated by exposing the feed to one or more beds of hydrotreatment catalyst. The entire hydrotreated feed, without separation, can then be dewaxed in the presence of one or more beds of dewaxing catalyst. The entire hydrotreated, dewaxed feed, without separation, can then optionally be hydrocracked in the presence of one or more beds of hydrocracking catalyst. An optional second hydrotreatment catalyst bed can also be included. By performing hydrotreating, dewaxing, and hydrocracking processes without an intermediate separation, the equipment required to perform these processes can be included in a single stage.

After the hydrotreating, dewaxing, and/or hydrocracking in a sour environment, the hydroprocessed feed can be fractionated into a variety of products. One option for fractionation can be to separate the hydroprocessed feed into portions boiling above and below a desired conversion temperature, such as 700° F. (371° C.). In this option, the portion boiling below 371° C. corresponds to a portion containing naphtha boiling range product, diesel boiling range product, hydrocarbons lighter than a naphtha boiling range product, and contaminant gases generated during hydroprocessing such as $H_2S$ and $NH_3$. Optionally, one or more of these various product streams can be separated out as a distinct product by the fractionation, or separation of these products from a portion boiling below 371° C. can occur in a later fractionation step. Optionally, the portion boiling below 371° C. can be fractionated to also include a kerosene product.

The portion boiling above 371° C. corresponds to a bottoms fraction. This bottoms fraction can be passed into a second hydroprocessing stage that includes one or more types of hydroprocessing catalysts. The second stage can include one or more beds of a hydrocracking catalyst, one or more beds of a dewaxing catalyst, and optionally one or more beds of a hydrofinishing or aromatic saturation catalyst. The reaction conditions for hydroprocessing in the second stage can be the same as or different from the conditions used in the first stage. Because of the hydrotreatment processes in the first stage and the fractionation, the sulfur content of the bottoms fraction, on a combined gas and liquid sulfur basis, can be 1000 wppm or less, or about 500 wppm or less, or about 100 wppm or less, or about 50 wppm or less, or about 10 wppm or less.

Still another option can be to include one or more beds of hydrofinishing or aromatic saturation catalyst in a separate third stage and/or reactor. In the discussion below, a reference to hydrofinishing is understood to refer to either hydrofinishing or aromatic saturation, or to having separate hydrofinishing and aromatic saturation processes. In situations where a hydrofinishing process is desirable for reducing the amount of aromatics in a feed, it can be desirable to operate the hydrofinishing process at a temperature that is colder than the temperature in the prior hydroprocessing stages. For example, it may be desirable to operate a dewaxing process at a temperature above 300° C. while operating a hydrofinishing process at a temperature below 280° C. One way to facilitate having a temperature difference between a dewaxing and/or hydrocracking process and a subsequent hydrofinishing process is to house the catalyst beds in separate reactors. A hydrofinishing or aromatic saturation process can be included either before or after fractionation of a hydroprocessed feed.

FIG. 1 shows an example of a general reaction system that utilizes two reaction stages suitable for use in various embodiments of the invention. In FIG. 1, a reaction system is shown that includes a first reaction stage 110, a separation stage 120, and a second reaction stage 130. Both the first reaction stage 110 and second reaction stage 130 are represented in FIG. 1 as single reactors. Alternatively, any convenient number of reactors can be used for the first stage 110 and/or the second stage 130. The separation stage 120 is a stage capable of separating a diesel fuel product from the effluent generated by the first stage.

A suitable feedstock 115 is introduced into first reaction stage 110 along with a hydrogen-containing stream 117. The feedstock is hydroprocessed in the presence of one or more catalyst beds under effective conditions. The effluent 119 from first reaction stage 110 is passed into separation stage 120. The separation stage 120 can produce at least a diesel product fraction 124, a bottoms fraction 126, and gas phase fraction 128. The gas phase fraction can include both contaminants such as $H_2S$ or $NH_3$ as well as low boiling point species such as $C_1$-$C_4$ hydrocarbons. Optionally, the separation stage 120 can also produce a naphtha fraction 122 and/or a kerosene fraction (not shown). The bottoms fraction 126 from the separation stage is used as input to the second hydroprocessing stage 130, along with a second hydrogen stream 137. The bottoms fraction is hydroprocessed in second stage 130. At least a portion of the effluent from second stage 130 can be sent to a fractionator 140 for production of one or more products, such as a second naphtha product 142, a second diesel product 144, or a lubricant base oil product 146.

Another portion of the bottoms from the fractionator 140 can optionally be recycled back 147 to second stage 130.

Figure 7:
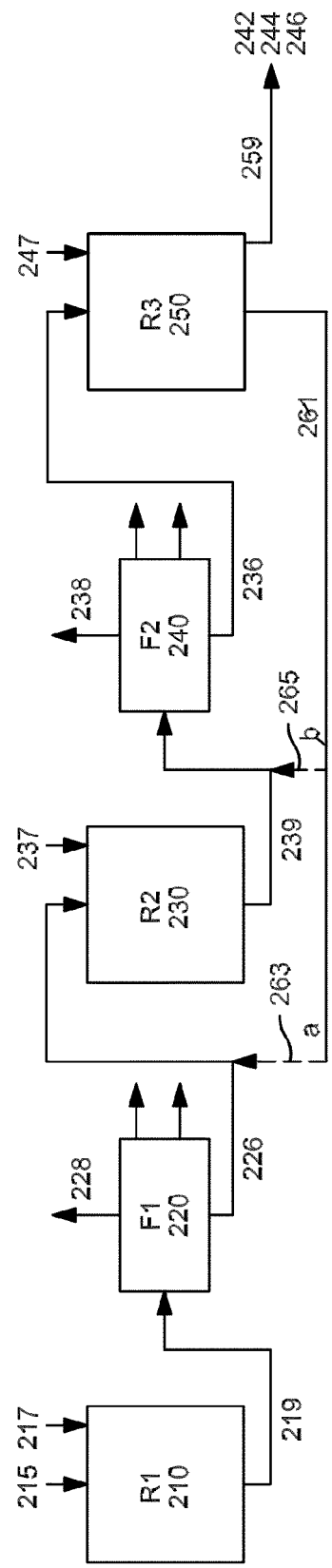
FIG. 7 schematically shows an example of a three-stage reaction system according to an alternative embodiment of the invention.

FIG. 7 shows an example of a general reaction system that utilizes three reaction stages suitable for use in alternative embodiments of the invention. In FIG. 7, a reaction system is shown that includes a first reaction stage 210, a first fractionation stage 220, a second reaction stage 230, a second fractionation stage 240, and a third reaction stage 250. The first reaction stage 210, second reaction stage 230 and third reaction stage 250 are represented in FIG. 7 as single reactors. Alternatively, any convenient number of reactors can be used for the first stage 210, second stage 230 and/or third stage 250. A suitable feedstock 215 is introduced into first reaction stage 210 along with a hydrogen-containing stream 217. The feedstock is hydroprocessed in the presence of one or more catalyst beds under effective conditions. In one form, the first reaction stage 210 may be a conventional hydrotreating reactor operating at effective hydrotreating conditions. The first reaction stage effluent 219 is fed to a first fractionator 220. The first fractionator 220 is a stage capable of removing a first fuel/diesel range material 228 and a first lube range material 226. The first lube range material 226 from the fractionator is used as input to the second reaction stage/hydroprocessing stage 230 along with a second hydrogen stream 237. The first lube range material 226 is hydroprocessed in the second reaction stage 230. In one form, the second reaction stage 230 may be a hydrodewaxing reactor loaded with a dewaxing catalyst and operated under effective dewaxing conditions. The second effluent 239 from the second reaction stage 230 is passed into a second fractionator 240. The second fractionator 240 can produce a second fuel/diesel range material 238 and a second lube range material 236. The second lube range material 236 from the second fractionator may be used as input to the third reaction stage/hydroprocessing stage 250, along with a third hydrogen stream 247. The second lube range material 236 is hydroprocessed in the third reaction stage 250. In one form, the third reaction stage 230 may be a hydrocracking reactor loaded with a hydrocracking catalyst. At least a portion of the effluent 259 from third reaction stage 250 can then be sent to a fractionator (not shown) for production of one or more products, such as a naphtha product 242, a fuel/diesel product 244, or a lubricant base oil product 246. Another portion of the bottoms 261 from the third reaction stage 250 can optionally be recycled back to either the second reaction stage 230 via recycle stream 263 or the second fractionation stage 240 via recycle stream 265 or a combination thereof. Recycle stream 263 is utilized when the product from third reaction stage 250 does not meet cold flow property specifications of the diesel product 244 or lubricant base oil product 246 and further dewaxing is necessary to meet the specifications. Recycle stream 265 is utilized when the product from third reaction stage 250 does not need further dewaxing to meet the cold flow property specifications of the diesel product 244 or lubricant base oil product 246. In another form, the process configuration of FIG. 7 may further include a hydrofinishing reactor after the third reaction stage and prior to the fractionator. The hydrofinishing reactor may be loading with a hydrofinishing catalyst and run at effective reaction conditions.

The process configuration of FIG. 7 maximizes the fuel/diesel yield in a 3-stage hydrocracker. The configuration produces a diesel product possessing superior cold flow properties. In contrast with the current state of the art, the diesel product coming from a hydrocracker may not produce diesel with ideal cold flow properties and would have to be subsequently dewaxed to improve product quality. With the process configuration of FIG. 7, all the diesel product would be sufficiently dewaxed before exiting the system to meet cold flow property requirements.

Figure 8:
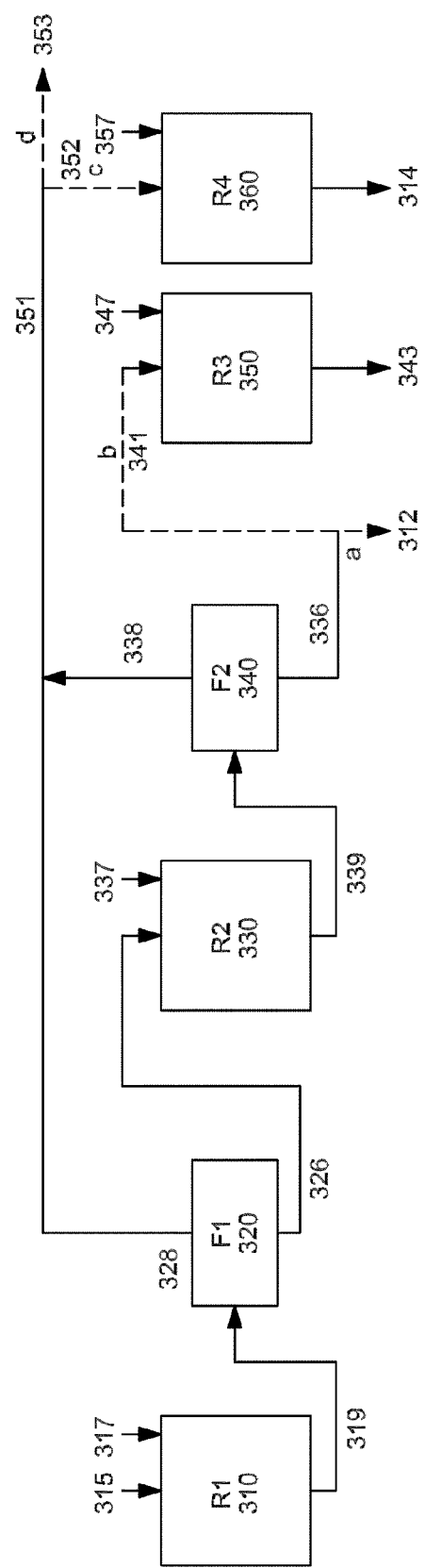
FIG. 8 schematically shows an example of a four-stage reaction system according to an alternative embodiment of the invention.

FIG. 8 shows an example of a general reaction system that utilizes four reaction stages suitable for use in alternative embodiments of the invention. In FIG. 8, a reaction system is shown that includes a first reaction stage 310, a first fractionation stage 320, a second reaction stage 330, a second fractionation stage 340, a third reaction stage 350, and an optional fourth reaction stage 360. The first reaction stage 310, second reaction stage 330, a third reaction stage 350 and a fourth reaction stage 360 are represented in FIG. 8 as single reactors. Alternatively, any convenient number of reactors can be used for the first stage 310, second stage 330, third stage 350 and/or fourth stage 360. A suitable feedstock 315 is introduced into first reaction stage 310 along with a hydrogen-containing stream 317. Hydrogen-containing streams may also be introduced into the second reaction stage 330, third reaction stage 350 and fourth reaction stage 360 as streams 337, 347 and 357, respectively. The first reaction stage 310 is a hydrotreating reactor operating under effective hydrotreating conditions, but may also include optionally stacked beds with hydroisomerization and/or hydrocracking catalysts. The first reaction stage effluent 319 is fed to a first fractionator 320. The first fractionator 320 is a stage capable of removing a first fuel/diesel range material 328 and a first lube range material 326. In the second reaction stage 330, the first lube range material 326 is hydrocracked to raise the VI by cracking of naphthenes under effective hydrocracking conditions. This second reaction stage 330 serves as the primary hydrocracker for the bottoms 326 from first fractionator 320. Optionally, there may also be within the second reaction stage 330 a stacked configuration utilizing a dewaxing catalyst above or below the hydrocracking catalyst. For maximum lube generation, the hydrocracking catalyst would be located prior to the dewaxing catalyst in the second reaction stage 330. The second reaction stage effluent 339 is fed to a second fractionator 340. The second fractionator 340 separates a second fuel/diesel range material 338 from the second lube range material 336 exiting the second reaction stage 330. The second fuel/diesel range material 338 is then combined with the first fuel/diesel range material 328 to form a combined fuel/diesel range material 351, which may be optionally passed to the fourth reaction stage 360, which is typically a hydrofinishing reactor operating at effective hydrofinishing conditions or a hydrodewaxing reactor operating at effective dewaxing conditions. The fourth reaction stage 360 serves as a isomerization reactor to improve the cold flow properties of at least one of the first lube range material 326 and second fuel/diesel range material 338 or the combined fuel/diesel range material 351. Alternatively, either the second fuel/diesel range material 338, or the combined fuel/diesel range material 351 may bypass the fourth reaction stage 360 where no cold flow improvement is needed. In the third reaction stage 350, the reactor is used to improve the performance of the second lube range material 336. The third reaction stage 350 may include a dewaxing catalyst, an aromatic saturation catalyst or both and operates to improve the cold flow properties. The third reaction stage effluent 343 results in a third lube range material 343.

In FIG. 8, flow path 342 will be chosen if the second lube range material 336 from second fractionator 340 does not require improved lube performance through aromatic saturation and/or dewaxing by bypassing the third reaction stage 350. This configuration eliminates the third reaction stage 350. Flow path 341 will be chosen if the second lube range material 336 from second fractionator 340 does require improved lube performance through aromatic saturation and/or dewaxing by passing through the third reaction stage 350. Flow path 352 will be chosen if the combined fuel/diesel range material 351 from the first and second fractionators need improved cold flow properties through dewaxing through the fourth reaction stage 360. Finally, flow path 353 will be chosen if the combined fuel/diesel range material 351 from the first and second fractionators do not need improved cold flow properties through dewaxing through the fourth reaction stage 360. This configuration eliminates the fourth reaction stage 360.

Figure 9:
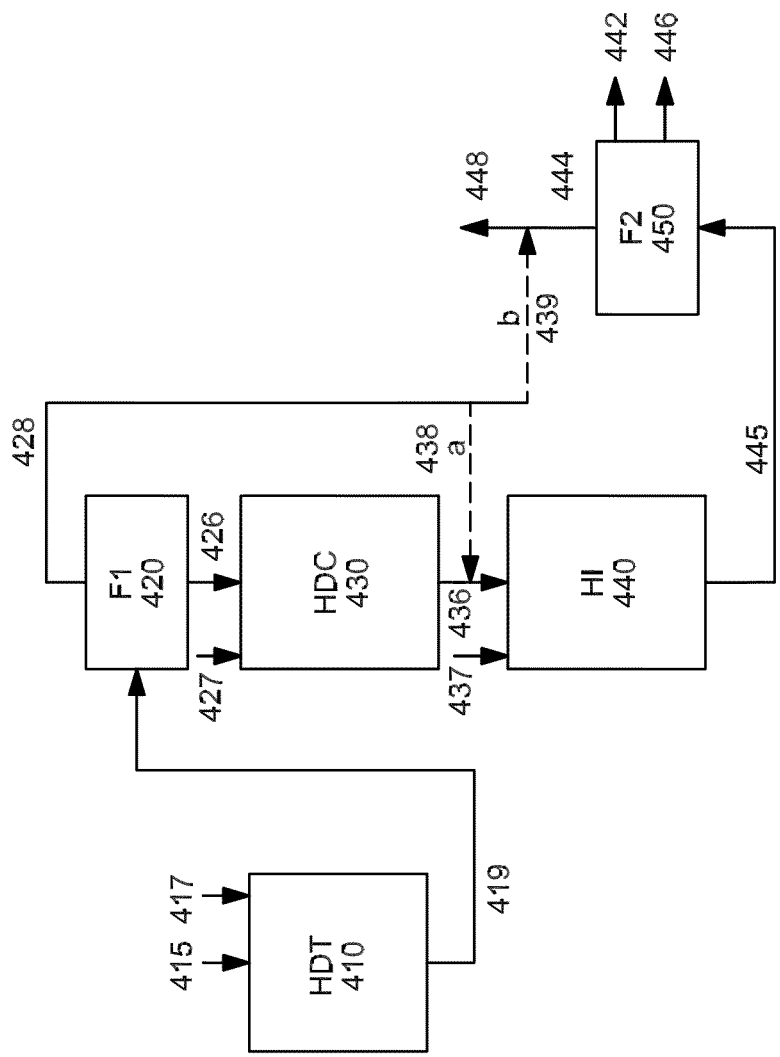
FIG. 9 schematically shows an example of a still yet another three-stage reaction system according to an alternative embodiment of the invention.

FIG. 9 shows an example of a general reaction system that utilizes three reaction stages suitable for use in alternative embodiments of the invention. In FIG. 9, a reaction system is shown that includes a first reaction stage 410, a first fractionation stage 420, a second reaction stage 430, a third reaction stage 440, and a second fractionation stage 450. The first reaction stage 410, second reaction stage 430 and third reaction stage 440 are represented in FIG. 9 as single reactors. Alternatively, any convenient number of reactors can be used for the first stage 410, second stage 430 and/or third stage 440. A suitable feedstock 415 is introduced into first reaction stage 410 along with a hydrogen-containing stream 417. The feedstock is hydroprocessed in the presence of one or more catalyst beds under effective conditions. In one form, the first reaction stage 410 may be a conventional hydrotreating reactor operating at effective hydrotreating conditions. The first reaction stage effluent 419 is fed to a first fractionator 420. The first fractionator 420 is a stage capable of removing a first fuel/diesel range material 428 and a first lube range material 426. The first lube range material 426 from the fractionator is used as input to the second reaction stage/hydroprocessing stage 430 along with a second hydrogen stream 427. The first lube range material 426 is hydroprocessed in the second reaction stage 430. In one form, the second reaction stage 430 may be a hydrocracking reactor loaded with a hydrocracking catalyst. The second effluent 436 from the second reaction stage 430 is passed into a third reaction stage 440. In one form, the third reaction stage 440 may be a hydrodewaxing reactor with an input hydrogen containing stream 437 loaded with a dewaxing catalyst and operating under effective hydrodewaxing conditions. The effluent 445 from the third reaction stage may then be input to a second fractionator 450. The second fractionator 450 can produce a second fuel/diesel range material 444 and a second lube range material 446. The second fractionator 450 may produce one or more products, such as a naphtha and LPG product 442, a fuel/diesel product 444, or a lubricant base oil product 446. Optionally, at least a portion of the first fuel/diesel range material 428 from the first fractionator 420 may be recycled to the third reaction stage 440 via flow line 438 where an improvement in cold flow properties of the fuel/diesel product is desired. Alternatively, a portion or all of the first fuel/diesel range material 428 from first fractionator 420 may be recycled to the third reaction stage (see flow line 439). The first and second fuel/diesel range materials 439 and 444 may then be combined to form a combined fuel/diesel product 448. The reaction system of FIG. 9 is particularly suitable for coproducing diesel and lube oil with good low temperature properties while producing limited amounts of naphtha and LPG.

Figure 2:
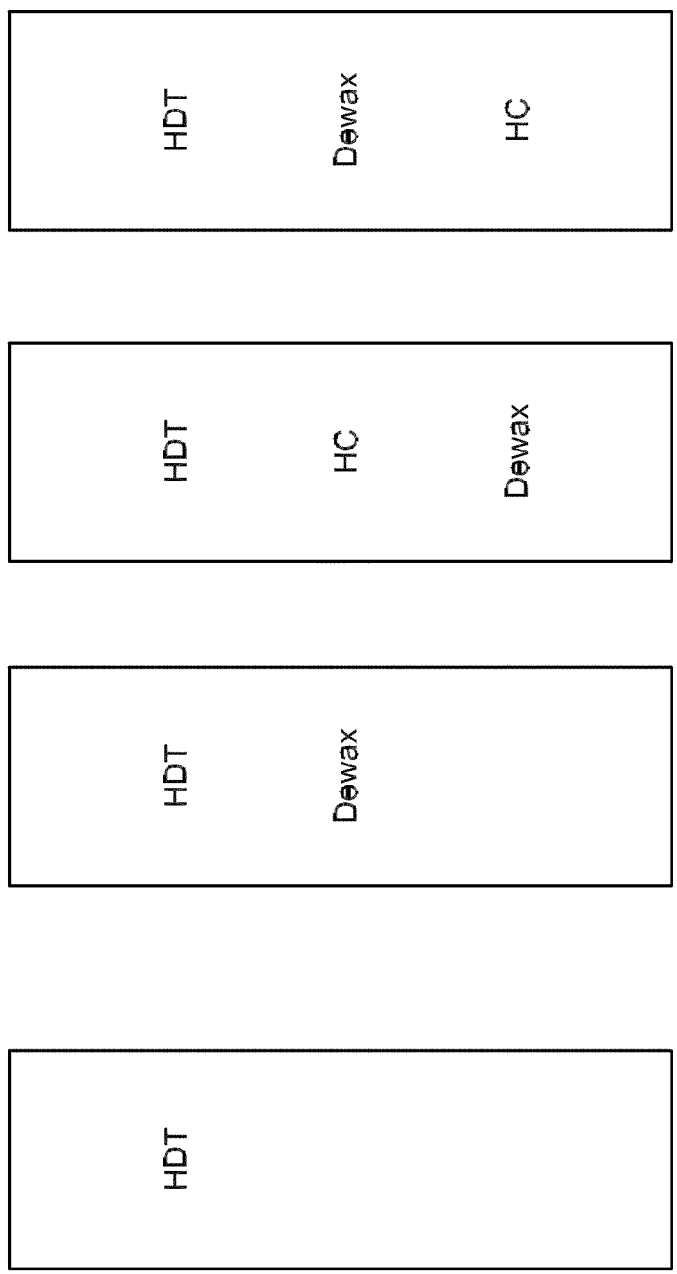
FIG. 2 schematically shows examples of catalyst configurations for a first reaction stage.

FIG. 2 shows examples of four catalyst configurations (A-D) that can be employed in a first stage under sour conditions. Configuration A shows a first reaction stage that includes hydrotreating catalyst. Configuration B shows a first reaction stage that includes beds of a hydrotreating catalyst and a dewaxing catalyst. Configuration C shows a first reaction stage that includes beds of a hydrotreating catalyst, a hydrocracking catalyst, and a dewaxing catalyst. Configuration D shows a first reaction stage that includes beds of a hydrotreating catalyst, a dewaxing catalyst, and a hydrocracking. Note that the reference here to "beds" of catalyst can include embodiments where a catalyst is provided as a portion of a physical bed within a stage.

The selection of a configuration from Configurations A, B, C, or D can be based on a desired type of product. For example, Configuration B includes a hydrotreatment catalyst and a dewaxing catalyst. A sour reaction stage based on Configuration B can be useful for producing an effluent with improved cold flow properties relative to Configuration A. A diesel fuel produced from processing in Configuration B can have an improved cloud point. The yield of diesel fuel will also be improved while reducing the amount of bottoms. The bottoms from Configuration B can also have an improved pour point. After fractionation to separate out products such as a diesel fuel product, as well as contaminant gases such as $H_2S$ and $NH_3$, the bottoms can be further processed in a second stage.

Configuration C can also provide a higher yield of diesel product as compared to Configuration A, along with an improved cloud point. Additionally, based on the presence of hydrocracking catalyst, Configuration C has benefits for producing a lube product from the bottoms portion. Relative to Configuration A, the pour point of the bottoms may be higher or lower. The dewaxing process will tend to lower the pour point of the bottoms fraction, while a hydrocracking process may tend to increase the pour point. Configuration D can provide a greater yield of diesel as compared to Configuration C, with a corresponding decrease in the amount of bottoms. In Configuration D, the dewaxing catalyst can increase the branching in the paraffinic molecules in the feed, which can increase the ability for the hydrocracking catalyst to convert the paraffinic molecules to lower boiling point species.

As an alternative, Configurations C and D can be compared to a conventional reactor containing a hydrotreating catalyst followed by a hydrocracking catalyst. Configurations C and D both can provide a diesel product with an improved cloud point relative to a convention hydrotreating/hydrocracking configuration, due to the presence of the dewaxing catalyst. The pour point for the bottoms in Configurations C and D can be lower than the bottoms for a conventional hydrotreating/hydrocracking process.

Figure 3:
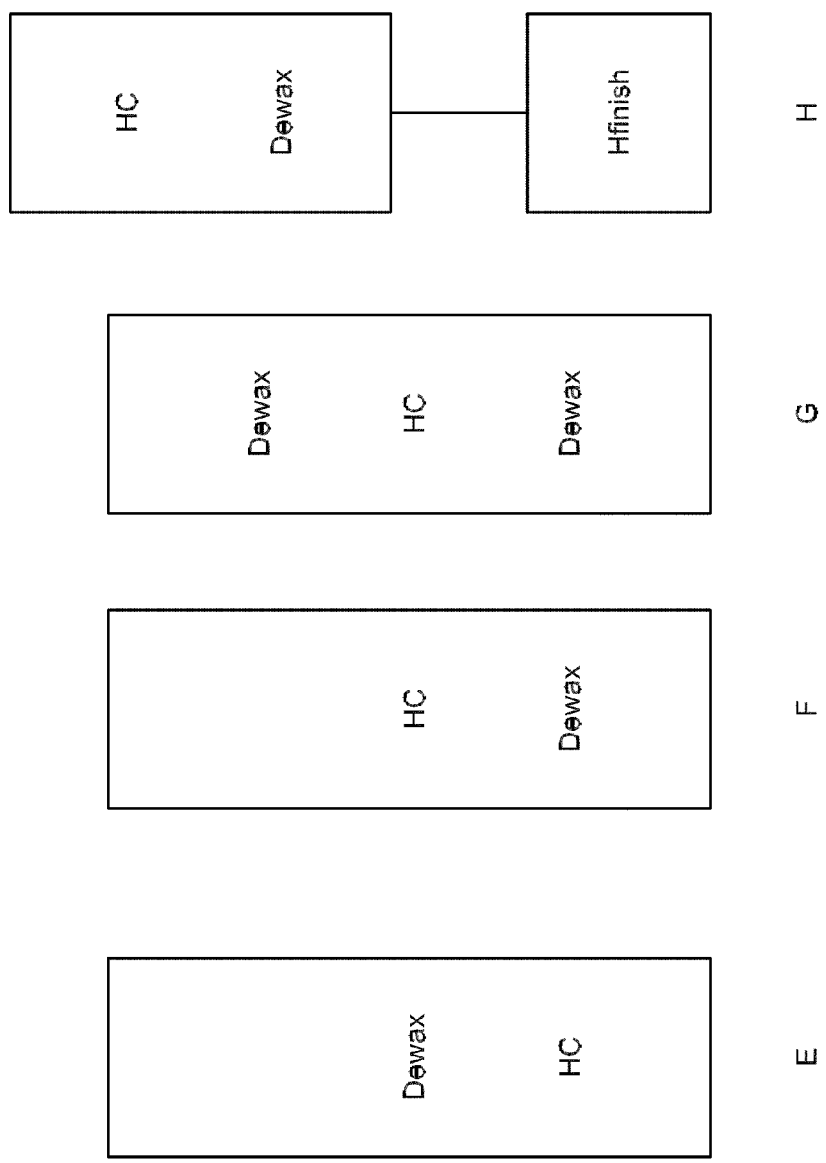
FIG. 3 schematically shows examples of catalyst configurations for a second reaction stage.

The bottoms from processing in a stage having a configuration corresponding to one of Configurations B, C, or D can then be processed in a second stage. Due to fractionation, the second stage can be a clean service stage, with a sulfur content of less than about 1000 wppm on a combined gas and liquid phase sulfur basis. FIG. 3 shows examples of catalyst configurations (E, F, G, and H) that can be employed in a second stage. Configuration E shows a second reaction stage that includes beds of dewaxing catalyst and hydrocracking catalyst. Configuration F shows a second reaction stage that includes beds of hydrocracking catalyst and dewaxing catalyst. Configuration G shows a second reaction stage that includes beds of dewaxing catalyst, hydrocracking catalyst, and more dewaxing catalyst. Note that in Configuration G, the second set of beds of dewaxing catalyst can include the same type(s) of dewaxing catalyst as the first group of beds or different type(s) of catalyst.

Optionally, a final bed of hydrofinishing catalyst could be added to any of Configurations E, F, or G. Configuration H shows this type of configuration, with beds of hydrocracking, dewaxing, and hydrofinishing catalyst. As noted above, each stage can include one or more reactors, so one option can be to house the hydrofinishing catalyst in a separate reactor from the catalysts shown for Configurations E, F, or G. This separate reactor is schematically represented in Configuration H. Note that the hydrofinishing beds can be included either before or after fractionation of the effluent from the second (or non-sour) reaction stage. As a result, hydrofinishing can be performed on a portion of the effluent from the second stage if desired.

Configurations E, F, and G can be used to make both a fuel product and a lubricant base oil product from the bottoms of the first sour stage. The yield of diesel fuel product can be higher for Configuration F relative to Configuration E, and higher still for Configuration G. Of course, the relative diesel yield of the configurations can be modified, such as by recycling a portion of the bottoms for further conversion.

Any of Configurations B, C, or D can be matched with any of Configurations E, F, or G in a two stage reaction system, such as the two stage system shown in FIG. 1. The bottoms portion from a second stage of any of the above combinations can have an appropriate pour point for use as a lubricant oil base stock, such as a Group II, Group II+, or Group III base stock. However, the aromatics content may be too high depending on the nature of the feed and the selected reaction conditions. Therefore a hydrofinishing stage can optionally be used with any of the combinations.

It is noted that some combinations of Configuration B, C, or D with a configuration from Configuration E, F, or G will result in the final bed of the first stage being of a similar type of catalyst to the initial bed of the second stage. For example, a combination of Configuration C with Configuration G would result in having dewaxing catalyst in both the last bed of the first stage and in the initial bed of the second stage. This situation still is beneficial, as the consecutive stages can allow less severe reaction conditions to be selected in each stage while still achieving desired levels of improvement in cold flow properties. This is in addition to the benefit of having dewaxing catalyst in the first stage to improve the cold flow properties of a diesel product separated from the effluent of the first stage.

Although Configurations B, C, and D have some advantages relative to Configuration A, in some embodiments Configuration A can also be used for the first stage. In particular, Configuration A can be used with Configurations E or G, where a dewaxing catalyst is followed by a hydrocracking catalyst.

Note that Configurations E, F, G, or H can optionally be expanded to include still more catalyst beds. For example, one or more additional dewaxing and/or hydrocracking catalyst beds can be included after the final dewaxing or catalyst bed shown in a Configuration. Additional beds can be included in any convenient order. For example, one possible extension for Configuration E would be to have a series of alternating beds of dewaxing catalyst and hydrocracking catalyst. For a series of four beds, this could result in a series of dewaxing—hydrocracking—dewaxing—hydrocracking. A similar extension of Configuration F could be used to make a series of hydrocracking—dewaxing—hydrocracking—dewaxing. A hydrofinishing catalyst bed could then be added after the final additional hydrocracking or dewaxing catalyst bed.

One example of a combination of configurations can be a combination of Configuration B with any of Configurations E, F, G, or H, or in particular a combination with Configuration F or H. These types of configurations can potentially be advantageous for increasing the diesel yield from a feedstock while reducing the amount of naphtha and maintaining a reasonable yield of lubricant base oil. Configuration B does not include a hydrocracking stage, so any diesel boiling range molecules present in a feed after only hydrotreatment and dewaxing are removed prior to hydrocracking. The second stage can then be operated to generate a desired level of conversion to diesel boiling range molecules without overcracking of any diesel molecules present in the initial feed.

Another example of a combination of configurations can be a combination of Configuration D with any of Configurations E, F, G, or H, or in particular a combination with Configuration E or G. These types of configurations can potentially be advantageous for maximizing the diesel yield from a feedstock. In Configuration D, the initial dewaxing catalyst bed can be used to make longer chain paraffins in a feedstock more accessible to the following hydrocracking catalyst. This can allow for the higher amounts of conversion under milder conditions, as the dewaxing catalyst is used to facilitate the hydrocracking instead of using increased temperature or hydrogen partial pressure. The conversion process can be continued in the second stage. Note that this type of configuration can include a recycle loop on the second stage to further increase diesel production. This could include an extinction recycle if no lube product is desired.

Yet another example of a combination of configurations can be a combination of Configuration C with any of Configurations E, F, G, or H, or in particular a combination with Configuration F or H. These types of configurations can potentially be advantageous for emphasizing lubricant base oil production in a reduced footprint reactor. Having a dewaxing catalyst in Configuration C after the initial hydrocracking stage can allow the initial hydrocracking to occur with a reduced impact on the paraffin molecules in a feed. This can preserve a greater amount of lubricant base oil yield while still having the benefit of producing a dewaxed diesel fuel product from the first reaction stage.

If a lubricant base stock product is desired, the lubricant base stock product can be further fractionated to form a plurality of products. For example, lubricant base stock products can be made corresponding to a 2 cSt cut, a 4 cSt cut, a 6 cSt cut, and/or a cut having a viscosity higher than 6 cSt. For example, a lubricant base oil product fraction having a viscosity of at least 2 cSt can be a fraction suitable for use in low pour point application such as transformer oils, low temperature hydraulic oils, or automatic transmission fluid. A lubricant base oil product fraction having a viscosity of at least 4 cSt can be a fraction having a controlled volatility and low pour point, such that the fraction is suitable for engine oils made according to SAE J300 in 0 W- or 5 W- or 10 W-grades. This fractionation can be performed at the time the diesel (or other fuel) product from the second stage is separated from the lubricant base stock product, or the fractionation can occur at a later time. Any hydrofinishing and/or aromatic saturation can occur either before or after fractionation. After fractionation, a lubricant base oil product fraction can be combined with appropriate additives for use as an engine oil or in another lubrication service.

Hydrotreatment Conditions

Hydrotreatment is typically used to reduce the sulfur, nitrogen, and aromatic content of a feed. Hydrotreating conditions can include temperatures of 200° C. to 450° C., or 315° C. to 425° C.; pressures of 250 psig (1.8 MPa) to 5000 psig (34.6 MPa) or 300 psig (2.1 MPa) to 3000 psig (20.8 MPa); Liquid Hourly Space Velocities (LHSV) of 0.2-10 $h^{-1}$; and hydrogen treat rates of 200 scf/B (35.6 $m^3/m^3$) to 10,000 scf/B (1781 $m^3/m^3$), or 500 (89 $m^3/m^3$) to 10,000 scf/B (1781 $m^3/m^3$).

Hydrotreating catalysts are typically those containing Group VIB metals (based on the Periodic Table published by Fisher Scientific), and non-noble Group VIII metals, i.e., iron, cobalt and nickel and mixtures thereof. These metals or mixtures of metals are typically present as oxides or sulfides on refractory metal oxide supports. Suitable metal oxide supports include low acidic oxides such as silica, alumina or titania, preferably alumina. Preferred aluminas are porous aluminas such as gamma or eta having average pore sizes from 50 to 200 Å, or 75 to 150 Å; a surface area from 100 to 300 m$^2$/g, or 150 to 250 m$^2$/g; and a pore volume of from 0.25 to 1.0 cm$^3$/g, or 0.35 to 0.8 cm$^3$/g. The supports are preferably not promoted with a halogen such as fluorine as this generally increases the acidity of the support.

Preferred metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina. Examples of suitable nickel/molybdenum catalysts include KF-840, KF-848, or a stacked bed of KF-848 or KF-840 and Nebula-20.

Alternatively, the hydrotreating catalyst can be a bulk metal catalyst, or a combination of stacked beds of supported and bulk metal catalyst. By bulk metal, it is meant that the catalysts are unsupported wherein the bulk catalyst particles comprise 30-100 wt. % of at least one Group VIII non-noble metal and at least one Group VIB metal, based on the total weight of the bulk catalyst particles, calculated as metal oxides and wherein the bulk catalyst particles have a surface area of at least 10 m$^2$/g. It is furthermore preferred that the bulk metal hydrotreating catalysts used herein comprise about 50 to about 100 wt %, and even more preferably about 70 to about 100 wt %, of at least one Group VIII non-noble metal and at least one Group VIB metal, based on the total weight of the particles, calculated as metal oxides. The amount of Group VIB and Group VIII non-noble metals can easily be determined VIB TEM-EDX.

Bulk catalyst compositions comprising one Group VIII non-noble metal and two Group VIB metals are preferred. It has been found that in this case, the bulk catalyst particles are sintering-resistant. Thus the active surface area of the bulk catalyst particles is maintained during use. The molar ratio of Group VIB to Group VIII non-noble metals ranges generally from 10:1-1:10 and preferably from 3:1-1:3. In the case of a core-shell structured particle, these ratios of course apply to the metals contained in the shell. If more than one Group VIB metal is contained in the bulk catalyst particles, the ratio of the different Group VIB metals is generally not critical. The same holds when more than one Group VIII non-noble metal is applied. In the case where molybdenum and tungsten are present as Group VIB metals, the molybenum:tungsten ratio preferably lies in the range of 9:1-1:9. Preferably the Group VIII non-noble metal comprises nickel and/or cobalt. It is further preferred that the Group VIB metal comprises a combination of molybdenum and tungsten. Preferably, combinations of nickel/molybdenum/tungsten and cobalt/molybdenum/tungsten and nickel/cobalt/molybdenum/tungsten are used. These types of precipitates appear to be sinter-resistant. Thus, the active surface area of the precipitate is maintained during use. The metals are preferably present as oxidic compounds of the corresponding metals, or if the catalyst composition has been sulfided, sulfidic compounds of the corresponding metals.

It is also preferred that the bulk metal hydrotreating catalysts used herein have a surface area of at least 50 m$^2$/g and more preferably of at least 100 m$^2$/g. It is also desired that the pore size distribution of the bulk metal hydrotreating catalysts be approximately the same as the one of conventional hydrotreating catalysts. Bulk metal hydrotreating catalysts have a pore volume of 0.05-5 ml/g, or of 0.1-4 ml/g, or of 0.1-3 ml/g, or of 0.1-2 ml/g determined by nitrogen adsorption. Preferably, pores smaller than 1 nm are not present. The bulk metal hydrotreating catalysts can have a median diameter of at least 50 nm, or at least 100 nm. The bulk metal hydrotreating catalysts can have a median diameter of not more than 5000 µm, or not more than 3000 µm. In an embodiment, the median particle diameter lies in the range of 0.1-50 µm and most preferably in the range of 0.5-50 µm.

Optionally, one or more beds of hydrotreatment catalyst can be located downstream from a hydrocracking catalyst bed and/or a dewaxing catalyst bed in the first stage. For these optional beds of hydrotreatment catalyst, the hydrotreatment conditions can be selected to be similar to the conditions above, or the conditions can be selected independently.

Hydrocracking Conditions

Hydrocracking catalysts typically contain sulfided base metals or Group VIII noble metals like Pt and/or Pd on acidic supports, such as amorphous silica alumina, cracking zeolites such as USY, or acidified alumina. Often these acidic supports are mixed or bound with other metal oxides such as alumina, titania or silica.

A hydrocracking process in the first stage (or otherwise under sour conditions) can be carried out at temperatures of 200° C. to 450° C., hydrogen partial pressures of from 250 psig to 5000 psig (1.8 MPa to 34.6 MPa), liquid hourly space velocities of from 0.2 h$^{-1}$ to 10 h$^{-1}$, and hydrogen treat gas rates of from 35.6 m$^3$/m$^3$ to 1781 m$^3$/m$^3$ (200 SCF/B to 10,000 SCF/B). Typically, in most cases, the conditions will have temperatures in the range of 300° C. to 450° C., hydrogen partial pressures of from 500 psig to 2000 psig (3.5 MPa-13.9 MPa), liquid hourly space velocities of from 0.3 h$^{-1}$ to 2 h$^{-1}$ and hydrogen treat gas rates of from 213 m$^3$/m$^3$ to 1068 m$^3$/m$^3$ (1200 SCF/B to 6000 SCF/B).

A hydrocracking process in a second stage (or otherwise under non-sour conditions) can be performed under conditions similar to those used for a first stage hydrocracking process, or the conditions can be different. In an embodiment, the conditions in a second stage can have less severe conditions than a hydrocracking process in a first (sour) stage. The temperature in the hydrocracking process can be 20° C. less than the temperature for a hydrocracking process in the first stage, or 30° C. less, or 40° C. less. The pressure for a hydrocracking process in a second stage can be 100 psig (690 kPa) less than a hydrocracking process in the first stage, or 200 psig (1380 kPa) less, or 300 psig (2070 kPa) less.

Hydrofinishing and/or Aromatic Saturation Process

In some embodiments, a hydrofinishing and/or aromatic saturation process can also be provided. The hydrofinishing and/or aromatic saturation can occur after the last hydrocracking or dewaxing stage. The hydrofinishing and/or aromatic saturation can occur either before or after fractionation. If hydrofinishing and/or aromatic saturation occurs after fractionation, the hydrofinishing can be performed on one or more portions of the fractionated product, such as being performed on one or more lubricant base stock portions. Alternatively, the entire effluent from the last hydrocracking or dewaxing process can be hydrofinished and/or undergo aromatic saturation.

In some situations, a hydrofinishing process and an aromatic saturation process can refer to a single process performed using the same catalyst. Alternatively, one type of catalyst or catalyst system can be provided to perform aromatic saturation, while a second catalyst or catalyst system can be used for hydrofinishing. Typically a hydrofinishing and/or aromatic saturation process will be performed in a separate reactor from dewaxing or hydrocracking processes for practical reasons, such as facilitating use of a lower temperature for the hydrofinishing or aromatic saturation process. However, an additional hydrofinishing reactor following a hydrocracking or dewaxing process but prior to fractionation could still be considered part of a second stage of a reaction system conceptually.

Hydrofinishing and/or aromatic saturation catalysts can include catalysts containing Group VI metals, Group VIII metals, and mixtures thereof. In an embodiment, preferred metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is about 30 wt. % or greater based on catalyst. Suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as about 20 weight percent for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41. If separate catalysts are used for aromatic saturation and hydrofinishing, an aromatic saturation catalyst can be selected based on activity and/or selectivity for aromatic saturation, while a hydrofinishing catalyst can be selected based on activity for improving product specifications, such as product color and polynuclear aromatic reduction.

Hydrofinishing conditions can include temperatures from about 125° C. to about 425° C., preferably about 180° C. to about 280° C., total pressures from about 500 psig (3.4 MPa) to about 3000 psig (20.7 MPa), preferably about 1500 psig (10.3 MPa) to about 2500 psig (17.2 MPa), and liquid hourly space velocity from about 0.1 $hr^{-1}$ to about 5 $hr^{-1}$ LHSV, preferably about 0.5 $hr^{-1}$ to about 1.5 $hr^{-1}$.

Dewaxing Process

In various embodiments, catalytic dewaxing can be included as part of the hydroprocessing in a first stage (or otherwise in a sour environment.) Because a separation does not occur in the first stage, any sulfur in the feed at the beginning of the stage will still be in the effluent that is passed to the catalytic dewaxing step in some form. For example, consider a first stage that includes hydrotreatment catalyst, hydrocracking catalyst, and dewaxing catalyst. A portion of the organic sulfur in the feed to the stage will be converted to $H_2S$ during hydrotreating and/or hydrocracking. Similarly, organic nitrogen in the feed will be converted to ammonia. However, without a separation step, the $H_2S$ and $NH_3$ formed during hydrotreating will travel with the effluent to the catalytic dewaxing stage. The lack of a separation step also means that any light gases ($C_1$-$C_4$) formed during hydrocracking will still be present in the effluent. The total combined sulfur from the hydrotreating process in both organic liquid form and gas phase (hydrogen sulfide) may be greater than 1,000 ppm by weight, or at least 2,000 ppm by weight, or at least 5,000 ppm by weight, or at least 10,000 ppm by weight, or at least 20,000 ppm by weight, or at least 40,000 ppm by weight. For the present disclosure, these sulfur levels are defined in terms of the total combined sulfur in liquid and gas forms fed to the dewaxing stage in parts per million (ppm) by weight on the hydrotreated feedstock basis.

Elimination of a separation step in the first reaction stage is enabled in part by the ability of a dewaxing catalyst to maintain catalytic activity in the presence of elevated levels of nitrogen and sulfur. Conventional catalysts often require pre-treatment of a feedstream to reduce the sulfur content to less than a few hundred ppm. By contrast, hydrocarbon feedstreams containing up to 4.0 wt % of sulfur or more can be effectively processed using the inventive catalysts. In an embodiment, the total combined sulfur content in liquid and gas forms of the hydrogen containing gas and hydrotreated feedstock can be at least 0.1 wt %, or at least 0.2 wt %, or at least 0.4 wt %, or at least 0.5 wt %, or at least 1 wt %, or at least 2 wt %, or at least 4 wt %. Sulfur content may be measured by standard ASTM methods D2622.

Hydrogen treat gas circulation loops and make-up gas can be configured and controlled in any number of ways. In the direct cascade, treat gas enters the hydrotreating reactor and can be once through or circulated by compressor from high pressure flash drums at the back end of the hydrocracking and/or dewaxing section of the unit. In circulation mode, make-up gas can be put into the unit anywhere in the high pressure circuit preferably into the hydrocracking/dewaxing reactor zone. In circulation mode, the treat gas may be scrubbed with amine, or any other suitable solution, to remove $H_2S$ and $NH_3$. In another form, the treat gas can be recycled without cleaning or scrubbing. Alternately, the liquid effluent may be combined with any hydrogen containing gas, including but not limited to $H_2S$ containing gas.

Preferably, the dewaxing catalysts according to the invention are zeolites that perform dewaxing primarily by isomerizing a hydrocarbon feedstock. More preferably, the catalysts are zeolites with a unidimensional pore structure. Suitable catalysts include 10-member ring pore zeolites, such as EU-1, ZSM-35 (or ferrierite), ZSM-11, ZSM-57, NU-87, SAPO-11, and ZSM-22. Preferred materials are EU-2, EU-11, ZBM-30, ZSM-48, or ZSM-23. ZSM-48 is most preferred. Note that a zeolite having the ZSM-23 structure with a silica to alumina ratio of from about 20:1 to about 40:1 can sometimes be referred to as SSZ-32. Other molecular sieves that are isostructural with the above materials include Theta-1, NU-10, EU-13, KZ-1, and NU-23.

In various embodiments, the catalysts according to the invention further include a metal hydrogenation component. The metal hydrogenation component is typically a Group VI and/or a Group VIII metal. Preferably, the metal hydrogenation component is a Group VIII noble metal. Preferably, the metal hydrogenation component is Pt, Pd, or a mixture thereof. In an alternative preferred embodiment, the metal hydrogenation component can be a combination of a non-noble Group VIII metal with a Group VI metal. Suitable combinations can include Ni, Co, or Fe with Mo or W, preferably Ni with Mo or W.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in the catalyst can be at least 0.1 wt % based on catalyst, or at least 0.15 wt %, or at least 0.2 wt %, or at least 0.25 wt %, or at least 0.3 wt %, or at least 0.5 wt % based on catalyst. The amount of metal in the catalyst can be 20 wt % or less based on catalyst, or 10 wt % or less, or 5 wt % or less, or 2.5 wt % or less, or 1 wt % or less. For embodiments where the metal is Pt, Pd, another Group VIII noble metal, or a combination thereof, the amount of metal can be from 0.1 to 5 wt %, preferably from 0.1 to 2 wt %, or 0.25 to 1.8 wt %, or 0.4 to 1.5 wt %. For embodiments where the metal is a combination of a non-noble Group VIII metal with a Group VI metal, the combined amount of metal can be from 0.5 wt % to 20 wt %, or 1 wt % to 15 wt %, or 2.5 wt % to 10 wt %.

Preferably, the dewaxing catalysts used in processes according to the invention are catalysts with a low ratio of silica to alumina. For example, for ZSM-48, the ratio of silica to alumina in the zeolite can be less than 200:1, or less than 110:1, or less than 100:1, or less than 90:1, or less than 80:1. In various embodiments, the ratio of silica to alumina can be from 30:1 to 200:1, 60:1 to 110:1, or 70:1 to 100:1.

The dewaxing catalysts useful in processes according to the invention can also include a binder. In some embodiments, the dewaxing catalysts used in process according to the invention are formulated using a low surface area binder, a low surface area binder represents a binder with a surface area of 100 m²/g or less, or 80 m²/g or less, or 70 m²/g or less.

Alternatively, the binder and the zeolite particle size are selected to provide a catalyst with a desired ratio of micropore surface area to total surface area. In dewaxing catalysts used according to the invention, the micropore surface area corresponds to surface area from the unidimensional pores of zeolites in the dewaxing catalyst. The total surface corresponds to the micropore surface area plus the external surface area. Any binder used in the catalyst will not contribute to the micropore surface area and will not significantly increase the total surface area of the catalyst. The external surface area represents the balance of the surface area of the total catalyst minus the micropore surface area. Both the binder and zeolite can contribute to the value of the external surface area. Preferably, the ratio of micropore surface area to total surface area for a dewaxing catalyst will be equal to or greater than 25%.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture. The amount of framework alumina in the catalyst may range from 0.1 to 3.33 wt %, or 0.1 to 2.7 wt %, or 0.2 to 2 wt %, or 0.3 to 1 wt %.

In yet another embodiment, a binder composed of two or more metal oxides can also be used. In such an embodiment, the weight percentage of the low surface area binder is preferably greater than the weight percentage of the higher surface area binder.

Alternatively, if both metal oxides used for forming a mixed metal oxide binder have a sufficiently low surface area, the proportions of each metal oxide in the binder are less important. When two or more metal oxides are used to form a binder, the two metal oxides can be incorporated into the catalyst by any convenient method. For example, one binder can be mixed with the zeolite during formation of the zeolite powder, such as during spray drying. The spray dried zeolite/binder powder can then be mixed with the second metal oxide binder prior to extrusion.

In yet another embodiment, the dewaxing catalyst is self-bound and does not contain a binder.

Process conditions in a catalytic dewaxing zone in a sour environment can include a temperature of from 200 to 450° C., preferably 270 to 400° C., a hydrogen partial pressure of from 1.8 to 34.6 mPa (250 to 5000 psi), preferably 4.8 to 20.8 mPa, a liquid hourly space velocity of from 0.2 to 10 v/v/hr, preferably 0.5 to 3.0, and a hydrogen circulation rate of from 35.6 to 1781 m³/m³ (200 to 10,000 scf/B), preferably 178 to 890.6 m³/m³ (1000 to 5000 scf/B).

For dewaxing in the second stage (or other non-sour environment), the dewaxing catalyst conditions can be similar to those for a sour environment. In an embodiment, the conditions in a second stage can have less severe conditions than a dewaxing process in a first (sour) stage. The temperature in the dewaxing process can be 20° C. less than the temperature for a dewaxing process in the first stage, or 30° C. less, or 40° C. less. The pressure for a dewaxing process in a second stage can be 100 psig (690 kPa) less than a dewaxing process in the first stage, or 200 psig (1380 kPa) less, or 300 psig (2070 kPa) less.

Dewaxing Catalyst Synthesis

In one form the of the present disclosure, the catalytic dewaxing catalyst includes from 0.1 wt % to 3.33 wt % framework alumina, 0.1 wt % to 5 wt % Pt, 200:1 to 30:1 SiO₂:Al₂O₃ ratio and at least one low surface area, refractory metal oxide binder with a surface area of 100 m²/g or less.

One example of a molecular sieve suitable for use in the claimed invention is ZSM-48 with a SiO₂:Al₂O₃ ratio of less than 110, preferably from about 70 to about 110. In the embodiments below, ZSM-48 crystals will be described variously in terms of "as-synthesized" crystals that still contain the (200:1 or less SiO₂:Al₂O₃ ratio) organic template; calcined crystals, such as Na-form ZSM-48 crystals; or calcined and ion-exchanged crystals, such as H-form ZSM-48 crystals.

The ZSM-48 crystals after removal of the structural directing agent have a particular morphology and a molar composition according to the general formula:

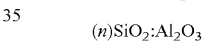

$(n)SiO_2:Al_2O_3$ where n is from 70 to 110, preferably 80 to 100, more preferably 85 to 95. In another embodiment, n is at least 70, or at least 80, or at least 85. In yet another embodiment, n is 110 or less, or 100 or less, or 95 or less. In still other embodiments, Si may be replaced by Ge and Al may be replaced by Ga, B, Fe, Ti, V, and Zr.

The as-synthesized form of ZSM-48 crystals is prepared from a mixture having silica, alumina, base and hexamethonium salt directing agent. In an embodiment, the molar ratio of structural directing agent:silica in the mixture is less than 0.05, or less than 0.025, or less than 0.022. In another embodiment, the molar ratio of structural directing agent:silica in the mixture is at least 0.01, or at least 0.015, or at least 0.016. In still another embodiment, the molar ratio of structural directing agent:silica in the mixture is from 0.015 to 0.025, preferably 0.016 to 0.022. In an embodiment, the as-synthesized form of ZSM-48 crystals has a silica:alumina molar ratio of 70 to 110. In still another embodiment, the as-synthesized form of ZSM-48 crystals has a silica:alumina molar ratio of at least 70, or at least 80, or at least 85. In yet another embodiment, the as-synthesized form of ZSM-48 crystals has a silica:alumina molar ratio of 110 or less, or 100 or less, or 95 or less. For any given preparation of the as-synthesized form of ZSM-48 crystals, the molar composition will contain silica, alumina and directing agent. It should be noted that the as-synthesized form of ZSM-48 crystals may have molar ratios slightly different from the molar ratios of reactants of the reaction mixture used to prepare the as-synthesized form. This result may occur due to incomplete incorporation of 100% of the reactants of the reaction mixture into the crystals formed (from the reaction mixture).

The ZSM-48 composition is prepared from an aqueous reaction mixture comprising silica or silicate salt, alumina or soluble aluminate salt, base and directing agent. To achieve the desired crystal morphology, the reactants in reaction mixture have the following molar ratios:

$SiO_2:Al_2O_3$ (preferred)=70 to 110
$H_2O:SiO_2$=1 to 500
$OH^-:SiO_2$=0.1 to 0.3
$OH^-:SiO_2$ (preferred)=0.14 to 0.18
template:$SiO_2$=0.01–0.05
template:$SiO_2$ (preferred)=0.015 to 0.025

In the above ratios, two ranges are provided for both the base:silica ratio and the structure directing agent:silica ratio. The broader ranges for these ratios include mixtures that result in the formation of ZSM-48 crystals with some quantity of Kenyaite and/or needle-like morphology. For situations where Kenyaite and/or needle-like morphology is not desired, the preferred ranges should be used.

The silica source is preferably precipitated silica and is commercially available from Degussa. Other silica sources include powdered silica including precipitated silica such as Zeosil® and silica gels, silicic acid colloidal silica such as Ludox® or dissolved silica. In the presence of a base, these other silica sources may form silicates. The alumina may be in the form of a soluble salt, preferably the sodium salt and is commercially available from US Aluminate. Other suitable aluminum sources include other aluminum salts such as the chloride, aluminum alcoholates or hydrated alumina such as gamma alumina, pseudobohemite and colloidal alumina. The base used to dissolve the metal oxide can be any alkali metal hydroxide, preferably sodium or potassium hydroxide, ammonium hydroxide, diquaternary hydroxide and the like. The directing agent is a hexamethonium salt such as hexamethonium dichloride or hexamethonium hydroxide. The anion (other than chloride) could be other anions such as hydroxide, nitrate, sulfate, other halide and the like. Hexamethonium dichloride is N,N,N,N',N',N'-hexamethyl-1,6-hexanediammonium dichloride.

In an embodiment, the crystals obtained from the synthesis according to the invention have a morphology that is free of fibrous morphology. Fibrous morphology is not desired, as this crystal morphology inhibits the catalytic dewaxing activity of ZSM-48. In another embodiment, the crystals obtained from the synthesis according to the invention have a morphology that contains a low percentage of needle-like morphology. The amount of needle-like morphology present in the ZSM-48 crystals can be 10% or less, or 5% or less, or 1% or less. In an alternative embodiment, the ZSM-48 crystals can be free of needle-like morphology. Low amounts of needle-like crystals are preferred for some applications as needle-like crystals are believed to reduce the activity of ZSM-48 for some types of reactions. To obtain a desired morphology in high purity, the ratios of silica:alumina, base:silica and directing agent:silica in the reaction mixture according to embodiments of the invention should be employed. Additionally, if a composition free of Kenyaite and/or free of needle-like morphology is desired, the preferred ranges should be used.

The as-synthesized ZSM-48 crystals should be at least partially dried prior to use or further treatment. Drying may be accomplished by heating at temperatures of from 100 to 400° C., preferably from 100 to 250° C. Pressures may be atmospheric or subatmospheric. If drying is performed under partial vacuum conditions, the temperatures may be lower than those at atmospheric pressures.

Catalysts are typically bound with a binder or matrix material prior to use. Binders are resistant to temperatures of the use desired and are attrition resistant. Binders may be catalytically active or inactive and include other zeolites, other inorganic materials such as clays and metal oxides such as alumina, silica, titania, zirconia, and silica-alumina. Clays may be kaolin, bentonite and montmorillonite and are commercially available. They may be blended with other materials such as silicates. Other porous matrix materials in addition to silica-aluminas include other binary materials such as silica-magnesia, silica-thoria, silica-zirconia, silica-beryllia and silica-titania as well as ternary materials such as silica-alumina-magnesia, silica-alumina-thoria and silica-alumina-zirconia. The matrix can be in the form of a co-gel. The bound ZSM-48 framework alumina will range from 0.1 wt % to 3.33 wt % framework alumina.

ZSM-48 crystals as part of a catalyst may also be used with a metal hydrogenation component. Metal hydrogenation components may be from Groups 6-12 of the Periodic Table based on the IUPAC system having Groups 1-18, preferably Groups 6 and 8-10. Examples of such metals include Ni, Mo, Co, W, Mn, Cu, Zn, Ru, Pt or Pd, preferably Pt or Pd. Mixtures of hydrogenation metals may also be used such as Co/Mo, Ni/Mo, Ni/W and Pt/Pd, preferably Pt/Pd. The amount of hydrogenation metal or metals may range from 0.1 to 5 wt %, based on catalyst. In an embodiment, the amount of metal or metals is at least 0.1 wt %, or at least 0.25 wt %, or at least 0.5 wt %, or at least 0.6 wt %, or at least 0.75 wt %, or at least 0.9 wt %. In another embodiment, the amount of metal or metals is 5 wt % or less, or 4 wt % or less, or 3 wt % or less, or 2 wt % or less, or 1 wt % or less. Methods of loading metal onto ZSM-48 catalyst are well known and include, for example, impregnation of ZSM-48 catalyst with a metal salt of the hydrogenation component and heating. The ZSM-48 catalyst containing hydrogenation metal may also be sulfided prior to use.

High purity ZSM-48 crystals made according to the above embodiments have a relatively low silica:alumina ratio. The silica:alumina ratio can be 110 or less, or 90 or less, or 75 or less. This lower silica:alumina ratio means that the present catalysts are more acidic. In spite of this increased acidity, they have superior activity and selectivity as well as excellent yields. They also have environmental benefits from the standpoint of health effects from crystal form and the small crystal size is also beneficial to catalyst activity.

For catalysts according to the invention that incorporate ZSM-23, any suitable method for producing ZSM-23 with a low $SiO_2:Al_2O_3$ ratio may be used. U.S. Pat. No. 5,332,566 provides an example of a synthesis method suitable for producing ZSM-23 with a low ratio of $SiO_2:Al_2O_3$. For example, a directing agent suitable for preparing ZSM-23 can be formed by methylating iminobispropylamine with an excess of iodomethane. The methylation is achieved by adding the iodomethane dropwise to iminobispropylamine which is solvated in absolute ethanol. The mixture is heated to a reflux temperature of 77° C. for 18 hours. The resulting solid product is filtered and washed with absolute ethanol.

The directing agent produced by the above method can then be mixed with colloidal silica sol (30% $SiO_2$), a source of alumina, a source of alkali cations (such as Na or K), and deionized water to form a hydrogel. The alumina source can be any convenient source, such as alumina sulfate or sodium aluminate. The solution is then heated to a crystallization temperature, such as 170° C., and the resulting ZSM-23 crystals are dried. The ZSM-23 crystals can then be combined with a low surface area binder to form a catalyst according to the invention.

The following are examples of the present disclosure and are not to be construed as limiting.

EXAMPLES

Example 1A

Synthesis of ZSM-48 Crystals with $SiO_2/Al_2O_3$ Ratio of ~70/1 and Preferred Morphology A mixture was prepared from a mixture of DI water, Hexamethonium Chloride (56% solution), Ultrasil silica, Sodium Aluminate solution (45%), and 50% sodium hydroxide solution, and ~0.15% (to reaction mixture) of ZSM-48 seed crystals. The mixture had the following molar composition:

$SiO2/SiO_2/Al_2O_3$~80
$H_2O/SiO_2$~15
$OH^-/SiO_2$~0.15
$Na^+/SiO_2$~0.15
Template/$SiO_2$~0.02

The mixture was reacted at 320° F. (160° C.) in a 5-gal autoclave with stirring at 250 RPM for 48 hours. The product was filtered, washed with deionized (DI) water and dried at 250° F. (120° C.). The XRD pattern of the as-synthesized material showed the typical pure phase of ZSM-48 topology. The SEM of the as-synthesized material shows that the material was composed of agglomerates of small irregularly shaped crystals (with an average crystal size of about 0.05 microns). The resulting ZSM-48 crystals had a $SiO_2/Al_2O_3$ molar ratio of ~71. The as-synthesized crystals were converted into the hydrogen form by three ion exchanges with ammonium nitrate solution at room temperature, followed by drying at 250° F. (120° C.) and calcination at 1000° F. (540° C.) for 4 hours. The resulting ZSM-48 (70:1 $SiO_2:Al_2O_3$) crystals had a total surface area of ~290 $m^2/g$ (external surface area of ~130 $m^2/g$), and an Alpha value of ~100, ~40% higher than current ZSM-48(90:1 $SiO_2:Al_2O_3$) Alumina crystals. The H-form crystals were then steamed at 700° F., 750° F., 800° F., 900° F., and 1000° F. for 4 hours for activity enhancement and Alpha values of these treated products are shown below:

170 (700° F.), 150 (750° F.), 140 (800° F.), 97 (900° F.), and 25 (1000° F.).

Example 1B

Preparation of the Sour Service Dewaxing Catalyst

The sour service hydroisomerization catalyst was prepared by mixing 65 wt % ZSM-48 (~70/1 $SiO_2/Al_2O_3$, see Example 1A) with 35 wt % P25 $TiO_2$ binder and extruding into a 1/20" quadralobe. This catalyst was then precalcined in nitrogen at 1000° F., ammonium exchanged with ammonium nitrate, and calcined at 1000° F. in full air. The extrudate was then steamed for 3 hours at 750° F. in full steam. The steamed catalyst was impregnated to 0.6 wt % platinum via incipient wetness using platinum tetraamine nitrate, dried, and then calcined at 680° F. for 3 hours in air. The ratio of micropore surface area to total surface area is about 45%.

Examples below demonstrate the advantages of various portions of a reaction system according to an embodiment of the invention. In various embodiments, a dewaxing or hydroisomerization step can be included in both a first, sour reaction stage and a second, non-sour reaction stage.

A medium vacuum gas oil feed (MVGO) was used in all examples below. The initial feed properties are shown in Table 1.

TABLE 1

| MVGO Feed Properties | |
|---|---|
| Feed Properties | MVGO Feed |
| 700° F.+ in Feed (wt %) | 90 |
| Feed Pour Point, ° C. | 30 |
| Solvent Dewaxed Oil Feed Pour Point, ° C. | −19 |
| Solvent Dewaxed Oil Feed 100° C. Viscosity, cSt | 7.55 |
| Solvent Dewaxed Oil Feed VI | 57.8 |
| Organic Sulfur in Feed (ppm by weight) | 25,800 |
| Organic Nitrogen in Feed (ppm by weight) | 809 |

Example 2

Example of Advantage of Interstage Distillate Recovery

The following example is based on process simulations using a kinetic model. In the simulations, a feedstock is represented as a one or more groups of molecular. The groups of molecules are based on the carbon number of the molecules and the molecular class of the molecules. Based on the process conditions selected for the simulation (such as pressure, temperature, hydrogen treat gas rate, and/or space velocity), each group of molecules is reacted according to a reaction order and rate appropriate for the group. Suitable reaction rate data for different types or groups of molecules can be obtained from the published literature, or reaction rate data can be generated experimentally. The products of the reaction calculations for each group of molecules are used to determine an output product in the simulation. In the reaction calculations, aromatics equilibrium can also be considered and used to modify the calculated aromatics content in the product.

The kinetic model was used to investigate the impact of interstage separation on diesel product yield. A pair of similar two stage configurations were modeled. One configuration did not have interstage separation between the two stages. A simulated fractionation was performed on the effluent from the second stage to determine the yield of various products. The second configuration included a separator to separate the effluent from the first stage into 700° F.− and 700° F.+ portions. The 700° F.+ portion was then processed in a second stage. In simulation of the second configuration, the 700° F.− portion and the effluent from the second stage were fractionated into diesel and lube oil products in a common fractionator. Note that the configuration including interstage separation is similar to the configuration shown in FIG. 1, with the exception that FIG. 1 does not show a fraction from separator 120 being passed into separator 140.

Figure 4:
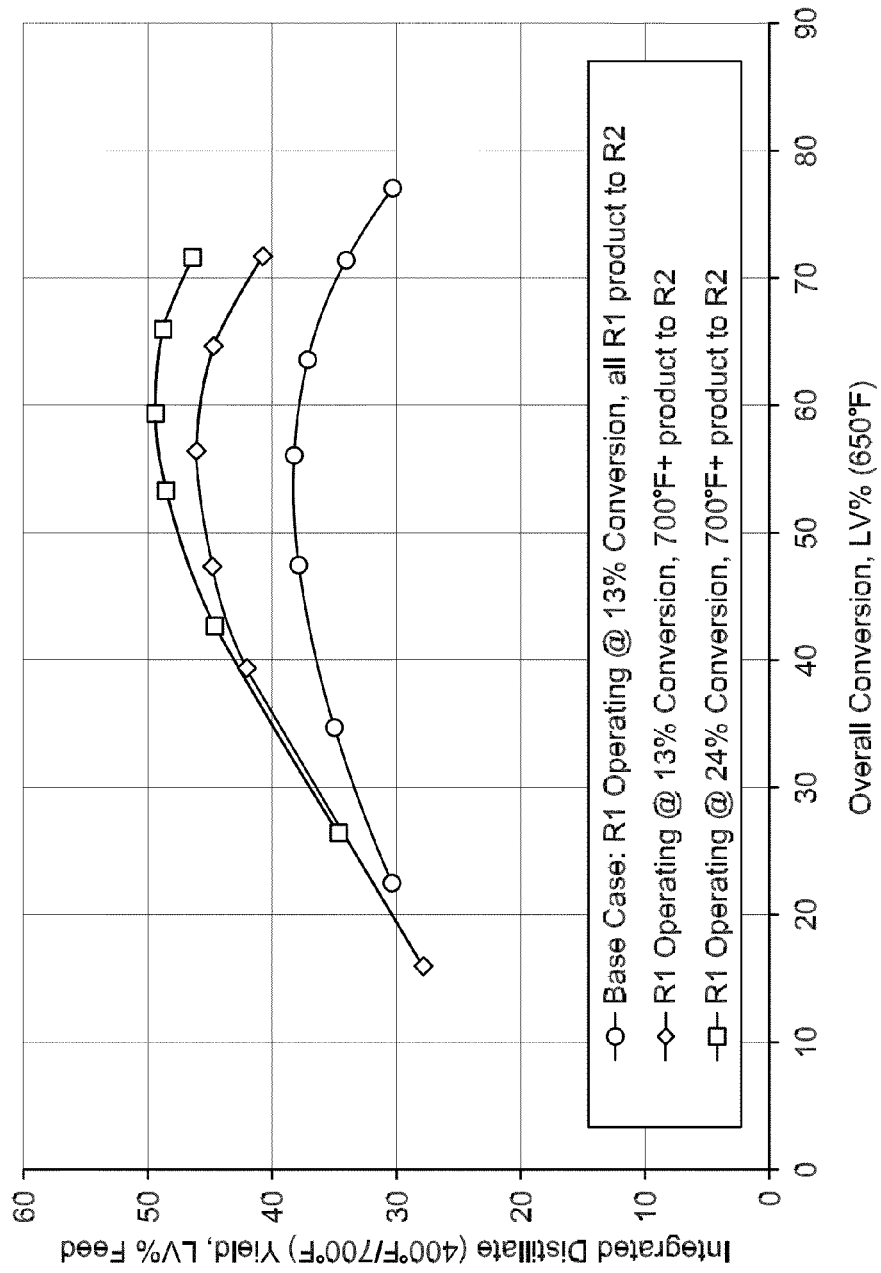
FIG. 4 shows predicted diesel fuel product yields for various processing configurations.

In a first series of simulations, the configuration without interstage separation was modeled. The 700° F.+ conversion for the first stage was set at 13%, while the total conversion from the two stages was varied to determine the yield of 400° F.-700° F. diesel product. This corresponds to a configuration including hydrocracking capability in both the first and second stage. The results from this series of simulations are shown in FIG. 4. In the first series of simulations, a maximum diesel yield of 38 vol % was predicted at 56% conversion.

In a second and third series of simulations, the configuration including interstage separation (similar to FIG. 1) was used. In the second series, the conversion in the first stage was set to 13%. In the third series, the conversion in the first stage was set to 24%. As shown in FIG. 4, the maximum diesel yield in both the second series (46 vol %) and third series (49 vol %)

of simulations was higher than the maximum yield in the first series without interstage separation. This increase in diesel yield was due at least in part to the removal of the 700° F.– portion of the feed between the first and second stages. The removal of the 700° F.– portion prevented overcracking of diesel molecules into naphtha or other lower value products.

Example 3

Example of Improved Diesel Yield Followed by Interstage Separation

FIG. 5 shows results from a series of runs performed on an MVGO feed using various configurations of catalysts. For the runs in FIG. 5, a first reactor was used that included a conventional hydrotreating catalyst. An MVGO feed was hydrotreated to produce a hydrotreated effluent having a sulfur content of less than 100 wppm. The hydrotreated effluent was then fractionated to remove all distillate and lighter hydrocarbons. The unconverted bottoms was hydroprocessed in a second reactor. The second reactor included a bed of hydrocracking catalyst, and an optional bed of dewaxing catalyst either prior to or after the hydrocracking catalyst bed. The hydrocracking catalyst was HSZ-390, a USY zeolite based catalyst. The dewaxing catalyst was selected from one of three choices. One type of catalyst was based on a 70:1 silica to alumina ratio ZSM-48 molecular sieve bound with a P25 (DeGussa) titania binder. The catalyst included a 65:35 ratio of molecular sieve to binder. The catalyst also included 2 wt % of Pt relative to the total weight of the catalyst. Another catalyst was based on a 90:1 silica to alumina ratio ZSM-48 molecular sieve, including a DT-51D (Rhone-Poulenc) titania binder and 2 wt % of Pt. A third catalyst was based on a 64:1 silica to alumina ratio ZSM-23 molecular sieve, including a Versal-300 alumina binder and 2 wt % of Pt. In the discussion below, the ZSM-48 and ZSM-23 catalysts may be referred to as dewaxing catalysts.

As shown in FIG. 5, eight different configurations were tested. In one configuration, only the USY catalyst was included in the second reactor. In the other configurations, the USY catalyst was stacked with one of the other catalysts. In the configurations involving both a USY catalyst and a ZSM-48 or ZSM-23 catalyst, a 70:30 ratio of USY to the other catalyst was used. The USY catalyst could be either first or second in terms of contact with the feed, as shown in FIG. 5. In the final run shown in FIG. 5, the USY and ZSM-48 catalyst beds were split so that the hydrotreated feed was exposed to a 4 part series of catalysts (USY:ZSM-48: USY:ZSM-48). The feed was processed at a space velocity of 2 hr$^{-1}$, a pressure of 1275 psig (8.8 MPa), and a hydrogen treat gas rate of 4000 scf/bbl (7100 m$^3$/m$^3$). The temperature was varied from 320° C. to 360° C., as shown in FIG. 5.

FIG. 5 shows the yield of diesel fuel product and the 700° F.+ conversion of the feed for the various runs. For the purposes of this example, a boiling range of 400° F.-700° F. was selected as corresponding to a diesel fuel product. The data in FIG. 5 can be used to compare the diesel yield, as a function of 700° F.+ conversion, for a USY catalyst alone versus stacked beds of both USY and another catalyst. In FIG. 5, a configuration involving USY catalyst alone provided a comparable or better diesel yield as compared to configurations where USY catalyst was stacked above a dewaxing catalyst. One exception is for a stacked bed of the USY above 70:1 ZSM-48, where an increase in diesel yield was observed at a processing temperature of 350° C. By contrast, a stacked bed having a ZSM-48 dewaxing catalyst followed by the USY catalyst showed an improved diesel yield relative to only the USY catalyst at a range of processing temperatures. From 330° C. to 350° C., using either the 70:1 or the 90:1 ZSM-48 above a USY catalyst resulted in an improved diesel yield at a comparable level of conversion.

Figure 6:
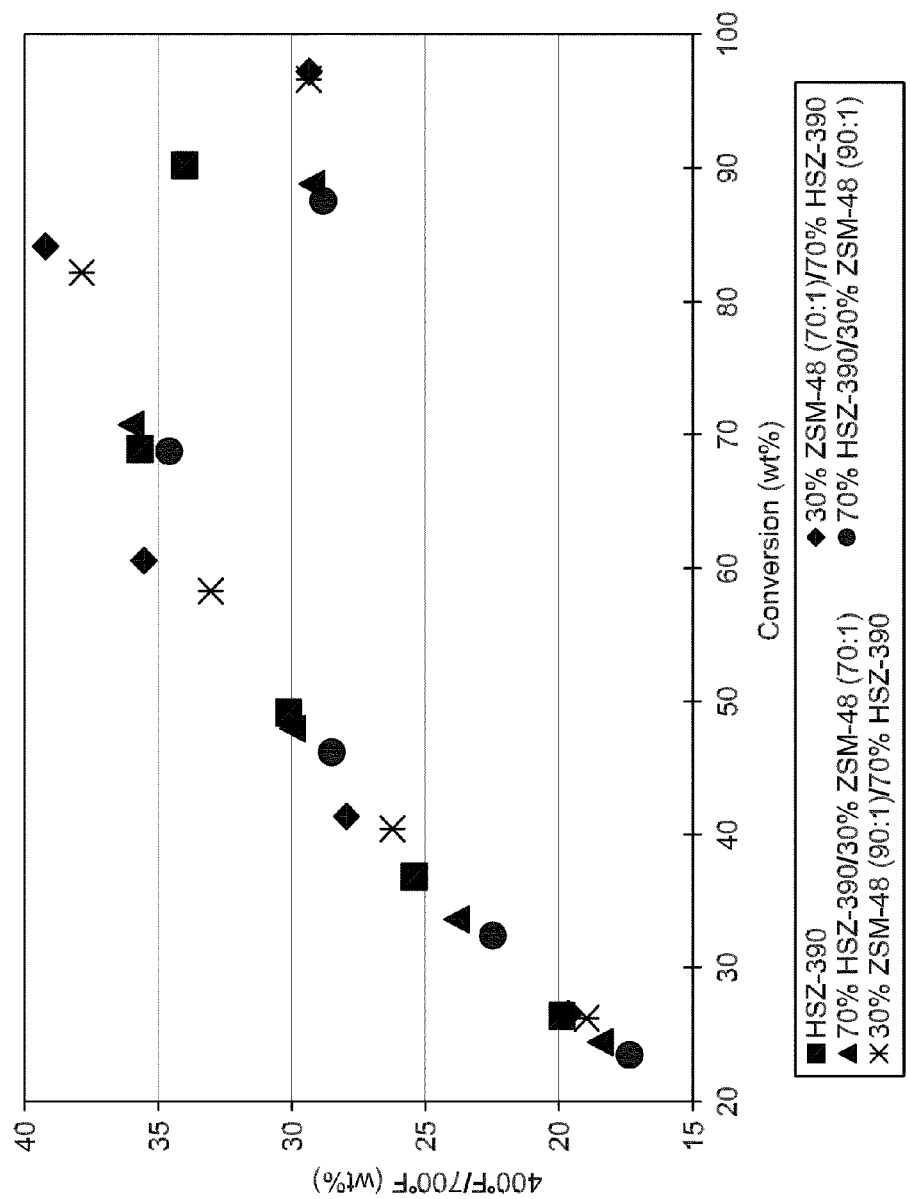

It is noted that part of the improvement in diesel yield may be due to an increase in the amount of conversion at a given temperature. However, it also appears that the maximum possible diesel yield as a function of conversion is improved. FIG. 6 shows a plot of a portion of the data from FIG. 5 that demonstrates the increase in the maximum diesel yield. In FIG. 6, the run corresponding to only the USY catalyst and runs including one bed each of ZSM-48 and USY are shown. Based on FIG. 6, it appears that an increased diesel yield can be achieved by processing a feed using a dewaxing catalyst, such as ZSM-48, followed by a hydrocracking catalyst, such as USY, to produce 65% to 90% conversion. Optionally, the amount of conversion can be selected to be 70% to 85%.

All of the runs including a dewaxing catalyst also showed an improvement visually in the quality of the total product. For the run using only a USY catalyst, the total liquid product was clear but included a white precipitate. For the runs including a dewaxing catalyst as well, the total liquid product was clear, with no apparent precipitate. This suggests an improvement in a cold flow property (such as cloud point or pour point) for the bottoms or lube portion of the total liquid product.

Process Example

The following is a prophetic example. An MVGO feed similar to the one described above can be processed in a reaction system having two stages. In the first stage, the feed is hydrotreated under effective hydrotreating conditions. The hydrotreated effluent is then hydrocracked under effective hydrocracking conditions using a catalyst based on zeolite Y. The hydrotreated, hydrocracked effluent is then dewaxed in the presence of a dewaxing catalyst suitable for use in sour service. The catalyst can include a bound ZSM-48 zeolite impregnated with less than 1 wt % Pt. The above processes occur without an intermediate separation step.

The dewaxed effluent is then fractionated. The fractionation produces both a naphtha product fraction and a diesel product fraction. Because of the hydrotreatment and dewaxing processes in the first stage, the diesel product from the fractionator is suitable for use in the diesel pool. The diesel product has a sulfur content of 15 wppm or less, and a cloud point below −10° C. The fractionator also produces a bottoms fraction. The bottoms fraction has a pour point below the pour point of the initial MVGO feed.

The bottoms fraction is passed into a second reaction stage. Due to the hydrotreatment in the first stage, the sulfur content of the bottoms fraction is less than 50 wppm. In the second stage, the bottoms fraction is hydrocracked, hydrofinished, and then dewaxed. The effluent from the second stage is fractionated to form a naphtha product, a diesel product, and a lubricant base oil product. Optionally, a portion of the lubricant base oil product is recycled to increase the amount of diesel produced in the second reaction stage.

Additional Embodiments:

In a first embodiment, a method is provided for producing a naphtha fuel, a diesel fuel, and a lubricant basestock. The method includes contacting a hydrotreated feedstock with a hydrocracking catalyst under first effective hydrocracking conditions to produce a hydrocracked effluent, the hydrotreated feedstock being cascaded to the hydrocracking catalyst without intermediate separation; cascading the entire hydrocracked effluent, without separation, to a catalytic dewaxing stage; dewaxing the entire hydrocracked effluent under first effective catalytic dewaxing conditions in the presence of a dewaxing catalyst, the dewaxing catalyst includes at least one non-dealuminated, unidimensional, 10-member ring pore zeolite and at least one Group VI or Group VIII metal or combination thereof; fractionating the dewaxed effluent to produce at least a naphtha product fraction, a first diesel product fraction, and a bottoms fraction; hydrocracking the bottoms fraction under second effective hydrocracking conditions; dewaxing the bottoms fraction under second effective catalytic dewaxing conditions; and fractionating the hydrocracked, dewaxed bottoms fraction to form at least a second diesel product fraction and a lubricant base oil product fraction.

In a second embodiment, a method according to the first embodiment is provided, wherein the dewaxing of the bottoms fraction is performed prior to said hydrocracking of the bottoms fraction.

In a third embodiment, a method according to any of the above embodiments is provided, wherein the bottoms fraction is dewaxed prior to said hydrocracking of the bottoms fraction and after said hydrocracking of the bottoms fraction.

In a fourth embodiment, a method according to the third embodiment is provided, wherein the bottoms fraction is dewaxed after said hydrocracking of the bottoms fraction under third effective catalytic dewaxing conditions.

In a fifth embodiment, a method according to any of the above embodiments is provided, wherein the hydrocracked, dewaxed bottoms fraction is hydrofinished under effective hydrofinishing conditions.

In a sixth embodiment, a method for producing a diesel fuel and a lubricant basestock is provided. The method includes contacting a hydrotreated feedstock with a dewaxing catalyst under first effective dewaxing conditions to produce a dewaxed effluent, the dewaxing catalyst includes at least one non-dealuminated, unidimensional, 10-member ring pore zeolite and at least one Group VIII metal, the combined total sulfur in liquid and gaseous forms fed to the dewaxing stage is greater than 1000 ppm by weight of sulfur on the hydrotreated feedstock basis, the hydrotreated feedstock being cascaded to the dewaxing catalyst without intermediate separation; fractionating the dewaxed effluent to produce at least a first diesel product fraction and a bottoms fraction; hydrocracking the bottoms fraction under second effective hydrocracking conditions; dewaxing the bottoms fraction under second effective catalytic dewaxing conditions; and fractionating the hydrocracked, dewaxed bottoms fraction to form at least a second diesel product fraction and a lubricant base oil product fraction.

In a seventh embodiment, a method according to the sixth embodiment is provided, wherein dewaxing the bottoms fraction occurs prior to said hydrocracking of the bottoms fraction.

In an eighth embodiment, a method according to the seventh embodiment is provided, wherein the bottoms fraction is dewaxed prior to said hydrocracking of the bottoms fraction and dewaxed after said hydrocracking of the bottoms fraction.

In a ninth embodiment, a method according to any of the sixth through eighth embodiments is provided, further comprising contacting the dewaxed feedstock with a hydrocracking catalyst under first effective hydrocracking conditions prior to fractionation of the dewaxed effluent.

In a tenth embodiment, a method according to any of the above embodiments is provided, wherein the second effective catalytic dewaxing conditions include a temperature that is at least about 20° C. lower than a temperature of the first effective catalytic dewaxing conditions.

In an eleventh embodiment, a method according to any of the above embodiments is provided, wherein a hydrogen gas introduced as part of first effective hydrocracking conditions or as part of first effective dewaxing conditions is chosen from a hydrotreated gas effluent, a clean hydrogen gas, a recycle gas and combinations thereof.

In a twelfth embodiment, a method according to any of the above embodiments is provided, wherein the dewaxing catalyst comprises a molecular sieve having a $SiO_2:Al_2O_3$ ratio of 200:1 to 30:1 and comprises from 0.1 wt % to 3.33 wt % framework $Al_2O_3$ content, the dewaxing catalyst including from 0.1 to 5 wt % platinum.

In a thirteenth embodiment, a method according to any of the above embodiments is provided, wherein the molecular sieve is EU-1, ZSM-35, ZSM-11, ZSM-57, NU-87, ZSM-22, EU-2, EU-11, ZBM-30, ZSM-48, ZSM-23, or a combination thereof.

In a fourteenth embodiment, a method according to the thirteenth embodiment is provided, wherein the molecular sieve is ZSM-48, ZSM-23, or a combination thereof, and preferably is ZSM-48.

In a fifteenth embodiment, a method according to any of the above embodiments is provided, wherein the dewaxing catalyst comprises at least one low surface area metal oxide, refractory binder, the binder being silica, alumina, titania, zirconia, or silica-alumina.

In a sixteenth embodiment, a method according to the fifteenth embodiment is provided, wherein the metal oxide, refractory binder further comprises a second metal oxide, refractory binder different from the first metal oxide, refractory binder.

In a fifteenth embodiment, a method according to the fifteenth or sixteenth embodiment is provided, wherein the dewaxing catalyst comprises a micropore surface area to total surface area ratio of greater than or equal to 25%, wherein the total surface area equals the surface area of the external zeolite plus the surface area of the binder, the surface area of the binder being 100 $m^2$/g or less.

In an eighteenth embodiment, a method according to any of the above embodiments is provided, wherein the hydrocracking catalyst is a zeolite Y based catalyst.

In a nineteenth embodiment, a method according to any of the above embodiments is provided, wherein fractionating to form a lubricant base oil product fraction comprises forming a plurality of lubricant base oil products, including a lubricant base oil product having a viscosity of at least 2 cSt, and a lubricant base oil product having a viscosity of at least 4 cSt suitable for use in engine oils made according to SAE J300 in 0 W-, 5 W-, or 10 W-grades.

In a twentieth embodiment, a method according to any of the above embodiments is provided, wherein at least a portion of the lubricant base oil product fraction is recycled as an input to said hydrocracking of the bottoms fraction.

In a twenty-first embodiment, a method according to any of the above embodiments is provided, wherein the first diesel product fraction has a higher cetane rating than the hydrotreated effluent, a lower cloud point than the hydrotreated effluent, or both a higher cetane rating and a lower cloud point than the hydrotreated effluent.

In a twenty-second embodiment, a method according to any of the above embodiments is provided, wherein the first diesel product fraction has a cloud point of less than −10° C., the second diesel product fraction has a cloud point of less than −10° C., and the hydrotreated effluent has a cloud point that is at least 5° C. higher than the first diesel product fraction cloud point or the second diesel product fraction cloud point.

In a twenty-third embodiment, a method according to any of the above embodiments is provided, wherein the first effective hydrocracking conditions include a temperature of 200°

C. to 450° C., a hydrogen partial pressure of 250 psig to 5000 psig (1.8 MPa to 34.6 MPa), a liquid hourly space velocity of 0.2 $h^{-1}$ to 10 $h^{-1}$, and a hydrogen treat gas rate of 35.6 $m^3/m^3$ to 1781 $m^3/m^3$ (200 SCF/B to 10,000 SCF/B), and preferably the first effective hydrocracking conditions include a temperature of 300° C. to 450° C., a hydrogen partial pressure of 500 psig to 2000 psig (3.5 MPa-13.9 MPa), a liquid hourly space velocity of 0.3 $h^{-1}$ to 2 $h^{-1}$, and a hydrogen treat gas rate of 213 $m^3/m^3$ to 1068 $m^3/m^3$ (1200 SCF/B to 6000 SCF/B).

In a twenty-fourth embodiment, a method according to any of the above embodiments is provided, wherein the second effective hydrocracking conditions include a temperature of 200° C. to 450° C., a hydrogen partial pressure of 250 psig to 5000 psig (1.8 MPa to 34.6 MPa), a liquid hourly space velocity of 0.2 $h^{-1}$ to 10 $h^{-1}$, and a hydrogen treat gas rate of 35.6 $m^3/m^3$ to 1781 $m^3/m^3$ (200 SCF/B to 10,000 SCF/B), and preferably the second effective hydrocracking conditions include a temperature of 300° C. to 450° C., a hydrogen partial pressure of 500 psig to 2000 psig (3.5 MPa-13.9 MPa), a liquid hourly space velocity of 0.3 $h^{-1}$ to 2 $h^{-1}$, and a hydrogen treat gas rate of 213 $m^3/m^3$ to 1068 $m^3/m^3$ (1200 SCF/B to 6000 SCF/B).

In a twenty-fifth embodiment, a method according to any of the above embodiments is provided, wherein the first effective dewaxing conditions include a temperature of from 200° C. to 450° C., preferably 270° C. to 400° C., a hydrogen partial pressure of from 1.8 MPa to 34.6 MPa (250 psi to 5000 psi), preferably 4.8 mPa to 20.8 mPa (700 psi to 3000 psi), a liquid hourly space velocity of from 0.2 to 10 $hr^{-1}$, preferably 0.5 to 3.0 $hr^{-1}$, and a hydrogen circulation rate of from 35.6 to 1781 $m^3/m^3$ (200 to 10,000 scf/B), preferably 178 to 890.6 $m^3/m^3$ (1000 to 5000 scf/B).

In a twenty-sixth embodiment, a method according to any of the above embodiments is provided, wherein the second effective dewaxing conditions include a temperature of from 200° C. to 450° C., preferably 270° C. to 400° C., a hydrogen partial pressure of from 1.8 MPa to 34.6 MPa (250 psi to 5000 psi), preferably 4.8 mPa to 20.8 mPa (700 psi to 3000 psi), a liquid hourly space velocity of from 0.2 to 10 $hr^{-1}$, preferably 0.5 to 3.0 $hr^{-1}$, and a hydrogen circulation rate of from 35.6 to 1781 $m^3/m^3$ (200 to 10,000 scf/B), preferably 178 to 890.6 $m^3/m^3$ (1000 to 5000 scf/B).

In a twenty-seventh embodiment, a method for producing a diesel fuel and a lubricant basestock is provided. The method includes contacting a feedstock with a hydrotreating catalyst under first effective hydrotreating conditions to produce a hydrotreated effluent; fractionating the hydrotreated effluent to produce at least a first diesel product fraction and a bottoms fraction; dewaxing the bottoms fraction under effective catalytic dewaxing conditions, the dewaxing catalyst includes at least one non-dealuminated, unidimensional, 10-member ring pore zeolite and at least one Group VI metal, Group VIII metal or combination thereof; hydrocracking the bottoms fraction under effective hydrocracking conditions; and fractionating the hydrocracked, dewaxed bottoms fraction to form at least a second diesel product fraction and a lubricant base oil product fraction.

In a twenty-eighth embodiment, a method according to the twenty-seventh embodiment is provided, wherein the effective hydrocracking conditions include a temperature of 200° C. to 450° C., a hydrogen partial pressure of 250 psig to 5000 psig (1.8 MPa to 34.6 MPa), a liquid hourly space velocity of 0.2 $h^{-1}$ to 10 $h^{-1}$, and a hydrogen treat gas rate of 35.6 $m^3/m^3$ to 1781 $m^3/m^3$ (200 SCF/B to 10,000 SCF/B).

In a twenty-ninth embodiment, a method according to any of the twenty-seventh or twenty-eighth embodiments is provided, wherein the effective dewaxing conditions include a temperature of from 200° C. to 450° C., a hydrogen partial pressure of from 1.8 MPa to 34.6 MPa (250 psi to 5000 psi), a liquid hourly space velocity of from 0.2 to 10 $hr^{-1}$, and a hydrogen circulation rate of from 35.6 to 1781 $m^3/m^3$ (200 to 10,000 scf/B).

In a thirtieth embodiment, a method according to any of the twenty-seventh through twenty-ninth embodiments is provided, wherein the total conversion of the hydrocracked, dewaxed bottoms relative to the feedstock is 65% to 90%, preferably 70% to 85%.

In a thirty-first embodiment, provided is a method for producing a diesel fuel and a lubricant basestock, including: contacting a feedstock with a hydrotreating catalyst under effective hydrotreating conditions to produce a hydrotreated effluent; fractionating the hydrotreated effluent to produce at least a first diesel product fraction and a bottoms fraction; hydrocracking the bottoms fraction under effective hydrocracking conditions; dewaxing the bottoms fraction under effective catalytic dewaxing conditions, the dewaxing catalyst including at least one non-dealuminated, unidimensional, 10-member ring pore zeolite, and at least one Group VI metal, Group VIII metal or combination thereof; and fractionating the hydrocracked, dewaxed bottoms fraction to form at least a second diesel product fraction and a lubricant base oil product fraction.

In a thirty-second embodiment, a method according to the thirty-first embodiment is provided, wherein at least a portion of the first diesel product fraction is fed to the dewaxing step.

In a thirty-third embodiment, a method according to the thirty-first to thirty-second embodiments is provided further including combining the first diesel product fraction and the second diesel product fraction.

In a thirty-fourth embodiment, a method according to the thirty-first to thirty-third embodiments is provided further including hydrofinishing the hydrocracked, dewaxed bottoms fraction under effective hydrofinishing conditions prior to the second fractionating step.

In a thirty-fifth embodiment, provided is a method for producing a diesel fuel and a lubricant basestock, including: contacting a feedstock with a hydrotreating catalyst under effective hydrotreating conditions to produce a hydrotreated effluent; fractionating the hydrotreated effluent to produce at least a first diesel product fraction and a first bottoms fraction; dewaxing the bottoms fraction under effective catalytic dewaxing conditions, the dewaxing catalyst including at least one non-dealuminated, unidimensional, 10-member ring pore zeolite, and at least one Group VI metal, Group VIII metal or combination thereof; fractionating the dewaxed bottoms fraction to form at least a second diesel product fraction and a second bottoms fraction, hydrocracking the second bottoms fraction under effective hydrocracking conditions to form a third bottoms fraction, and fractionating the third bottoms fraction to form at least a naphtha product fraction, a diesel product fraction and a lubricant base oil product fraction.

In a thirty-sixth embodiment, a method according to the thirty-fifth embodiment is provided, wherein at least a portion of the third bottoms fraction is recycled back to the dewaxing step.

In a thirty-seventh embodiment, a method according to the thirty-fifth to thirty-sixth embodiments is provided, wherein at least a portion of the third bottoms fraction is recycled back to the second fractionating step.

In a thirty-eighth embodiment, a method according to the thirty-fifth to thirty-seventh embodiments is provided further including hydrofinishing the third bottoms fraction under effective hydrofinishing conditions prior to the third fractionating step.

In a thirty-ninth embodiment, provided is a method for producing a diesel fuel and a lubricant basestock, including: contacting a feedstock with a hydrotreating catalyst under effective hydrotreating conditions to produce a hydrotreated effluent; fractionating the hydrotreated effluent to produce at least a first diesel product fraction and a first bottoms fraction; hydrocracking the first bottoms fraction under effective hydrocracking conditions to form a second bottoms fraction; fractionating the second bottoms fraction to form at least a second diesel product fraction and a third bottoms fraction, dewaxing at least a portion of the third bottoms fraction under effective catalytic dewaxing conditions, the dewaxing catalyst including at least one non-dealuminated, unidimensional, 10-member ring pore zeolite, and at least one Group VI metal, Group VIII metal or combination thereof; and fractionating the dewaxed third bottoms fraction and the non-dewaxed third bottoms fraction to form at least a naphtha product fraction, a third diesel product fraction and a lubricant base oil product fraction.

In a fortieth embodiment, a method according to the thirty-ninth embodiment is provided, further including dewaxing a portion of the first diesel product fraction, the second diesel product fraction or a combination thereof under effective catalytic dewaxing conditions.

In a forty-first embodiment, a method according to the thirty-ninth to fortieth embodiments is provided, further including combining the first diesel product fraction, the second diesel product fraction and the third diesel product fraction.

In a forty-second embodiment, a method according to the thirty-ninth to forty-first embodiments is provided, further including hydrofinishing the dewaxed third bottoms fraction under effective hydrofinishing conditions prior to the third fractionating step.

In a forty-third embodiment, provided is a method for producing a naphtha fuel, a diesel fuel, and a lubricant basestock including: contacting a hydrotreated feedstock without intermediate separation with a hydrocracking catalyst under first effective hydrocracking conditions to produce a hydrocracked effluent; catalytically dewaxing without intermediate separation the entire hydrocracked effluent under first effective catalytic dewaxing conditions in the presence of a first dewaxing catalyst including at least one non-dealuminated, unidimensional, 10-member ring pore zeolite, and at least one Group VI metal or Group VIII metal or combination thereof to form a dewaxed effluent, wherein the combined total sulfur in liquid and gaseous forms fed to the catalytic dewaxing step is greater than 1000 ppm by weight of sulfur on a hydrotreated feedstock basis; fractionating the dewaxed effluent to produce at least a naphtha product fraction, a first diesel product fraction, and a bottoms fraction; hydrocracking the bottoms fraction under second effective hydrocracking conditions; catalytically dewaxing the bottoms fraction under second effective catalytic dewaxing conditions in the presence of a second dewaxing catalyst including at least one non-dealuminated, unidimensional, 10-member ring pore zeolite, and at least one Group VI metal or Group VIII metal or combination thereof; and fractionating the hydrocracked, dewaxed bottoms fraction to form at least a second diesel product fraction and a lubricant base oil product fraction.

In a forty-fourth embodiment, a method according to the forty-third embodiment is provided, wherein the first dewaxing catalyst, the second dewaxing catalyst, or both the first dewaxing catalyst and the second dewaxing catalyst include at least one low surface area metal oxide, refractory binder.

In a forty-fifth embodiment, a method according to the forty-third to forty-fourth embodiments is provided, wherein the catalytically dewaxing of the bottoms fraction occurs prior to the second hydrocracking step, after the second hydrocracking step, or both prior to and after the second hydrocracking step.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

What is claimed is:

1. A method for producing a diesel fuel and a lubricant basestock, comprising:
   contacting a feedstock with a hydrotreating catalyst under effective hydrotreating conditions to produce a hydrotreated effluent;
   fractionating the hydrotreated effluent to produce at least a first diesel product fraction and a bottoms fraction;
   hydrocracking the bottoms fraction under effective hydrocracking conditions;
   dewaxing the bottoms fraction under effective catalytic dewaxing conditions, the dewaxing catalyst including at least one non-dealuminated, unidimensional, 10-member ring pore zeolite, and at least one Group VI metal, Group VIII metal, or combination thereof;
   and fractionating the hydrocracked, dewaxed bottoms fraction to form at least a second diesel product fraction and a lubricant base oil product fraction.

2. The method of claim 1, wherein at least a portion of the first diesel product fraction is fed to the dewaxing step.

3. The method of claim 1, further including combining the first diesel product fraction and the second diesel product fraction.

4. The method of claim 1, wherein the effective hydrotreating conditions include a temperature of from 200° C. to 450° C., hydrogen partial pressure of from 1.8 MPa to 34.6 MPa (250 psi to 5000 psi), a liquid hourly space velocity of from 0.2 to 10 $hr^{-1}$, and a hydrogen circulation rate of from 35.6 to 1781 $m^3/m^3$ (200 to 10,000 scf/B).

5. The method of claim 1, wherein the effective hydrocracking conditions include a temperature of 200° C. to 450° C., a hydrogen partial pressure of 250 psig to 5000 psig (1.8 MPa to 34.6 MPa), a liquid hourly space velocity of 0.2 $h^{-1}$ to 10 $h^{-1}$, and a hydrogen treat gas rate of 35.6 $m^3/m^3$ to 1781 $m^3/m^3$ (200 SCF/B to 10,000 SCF/B).

6. The method of claim 1, wherein the effective dewaxing conditions include a temperature of from 200° C. to 450° C., a hydrogen partial pressure of from 1.8 MPa to 34.6 MPa (250 psi to 5000 psi), a liquid hourly space velocity of from 0.2 to 10 hr$^{-1}$, and a hydrogen circulation rate of from 35.6 to 1781 m$^3$/m$^3$ (200 to 10,000 scf/B).

7. The method of claim 1, wherein a hydrogen gas introduced as part of effective hydrotreating conditions, effective dewaxing conditions, or effective hydrocracking conditions is chosen from a hydrotreated gas effluent, a clean hydrogen gas, a recycle gas and combinations thereof.

8. The method of claim 1, wherein the dewaxing catalyst comprises a molecular sieve having a SiO$_2$:Al$_2$O$_3$ ratio of 200:1 to 30:1 and comprises from 0.1 wt % to 3.33 wt % framework Al$_2$O$_3$ content, the dewaxing catalyst including from 0.1 to 5 wt % platinum.

9. The method of claim 8, wherein the molecular sieve is EU-1, ZSM-35, ZSM-11, ZSM-57, NU-87, ZSM-22, EU-2, EU-11, ZBM-30, ZSM-48, ZSM-23, or a combination thereof.

10. The method of claim 9, wherein the molecular sieve is ZSM-48, ZSM-23, or a combination thereof.

11. The method of claim 1, wherein the dewaxing catalyst comprises at least one low surface area metal oxide, refractory binder, the binder being silica, alumina, titania, zirconia, or silica-alumina.

12. The method of claim 11, wherein the metal oxide, refractory binder further comprises a second metal oxide, refractory binder different from the first metal oxide, refractory binder.

13. The method of claim 11, wherein the dewaxing catalyst comprises a micropore surface area to total surface area ratio of greater than or equal to 25%, wherein the total surface area equals the surface area of the external zeolite plus the surface area of the binder, the surface area of the binder being 100 m$^2$/g or less.

14. The method of claim 1, wherein the hydrocracking catalyst is a zeolite Y based catalyst.

15. The method of claim 1 further including hydrofinishing the hydrocracked, dewaxed bottoms fraction under effective hydrofinishing conditions prior to the second fractionating step.

16. The method of claim 1, wherein fractionating to form a lubricant base oil product fraction comprises forming a plurality of lubricant base oil products, including a lubricant base oil product having a viscosity of at least 2cSt, and a lubricant base oil product having a viscosity of at least 4 cSt suitable for use in engine oils made according to SAE J300 in 0W-, 5W-, or 10W- grades.

* * * * *